United States Patent

Murata et al.

[11] Patent Number: 5,566,254
[45] Date of Patent: Oct. 15, 1996

[54] APPARATUS FOR PROCESSING MULTIPLE IMAGES IN ALTERNATING FASHION

[75] Inventors: Yukio Murata, Yokohama; Takahiro Kiyohara, Tokyo, both of Japan

[73] Assignee: Canon Kabushiki Kaisha, Tokyo, Japan

[21] Appl. No.: 140,565

[22] Filed: Oct. 25, 1993

[30] Foreign Application Priority Data

| Nov. 6, 1992 | [JP] | Japan | 4-296929 |
| Jul. 28, 1993 | [JP] | Japan | 5-186055 |
| Sep. 3, 1993 | [JP] | Japan | 5-219734 |

[51] Int. Cl.⁶ .................................................. G06K 9/36
[52] U.S. Cl. ........................... 382/304; 382/233; 382/234; 358/426
[58] Field of Search ........................... 382/56, 305, 304, 382/233, 234; 358/425, 426, 436, 437, 450, 444, 404

[56] References Cited

U.S. PATENT DOCUMENTS

| 4,701,803 | 10/1987 | Sato | 358/260 |
| 4,760,466 | 7/1988 | Nakamura | 358/425 |
| 4,837,634 | 6/1989 | Hisada | 358/261.1 |
| 4,924,494 | 5/1990 | Shung | 379/100 |
| 4,967,288 | 10/1990 | Mizutori et al. | 358/404 |
| 5,068,745 | 11/1991 | Shimura | 358/444 |
| 5,109,439 | 4/1992 | Froessl | 382/61 |
| 5,119,210 | 6/1992 | Baba | 358/444 |
| 5,170,266 | 12/1992 | Marsh et al. | 358/468 |
| 5,200,830 | 4/1993 | Imaizumi et al. | 358/437 |
| 5,202,878 | 11/1993 | Esserman | 358/426 |
| 5,267,051 | 11/1993 | Dellert et al. | 382/56 |
| 5,315,408 | 5/1994 | Kawahara et al. | 358/444 |
| 5,317,416 | 5/1994 | Tsuboi et al. | 358/444 |
| 5,432,614 | 7/1995 | Yamamoto | 358/444 |

FOREIGN PATENT DOCUMENTS

| 0357427 | 7/1990 | European Pat. Off. | H04M 11/06 |
| 0461023 | 11/1991 | European Pat. Off. | H04M 1/32 |
| 2418588 | 9/1979 | France | H04N 1/00 |
| 2418590 | 9/1979 | France | H04N 1/40 |
| 467768 | 1/1990 | France | H04N 1/32 |
| 62-031259 | 2/1987 | Japan | H04N 1/417 |
| 62-035775 | 2/1987 | Japan | H04N 1/417 |
| 62-035776 | 2/1987 | Japan | H04N 1/417 |
| 62-035777 | 2/1987 | Japan | H04N 1/417 |
| 62-035778 | 2/1987 | Japan | H04N 1/417 |
| 62-035779 | 2/1987 | Japan | H04N 1/417 |
| 62-035780 | 2/1987 | Japan | H04N 1/417 |
| 2065453 | 3/1990 | Japan | H04M 11/00 |

*Primary Examiner*—Leo Boudreau
*Assistant Examiner*—David R. Anderson
*Attorney, Agent, or Firm*—Fitzpatrick, Cella, Harper & Scinto

[57] ABSTRACT

A decoding processing is executed in a multiple processing at high speed with a simple construction or control in a manner such that the image memory 11 stores an input compressed code, the multiplexer 14 selects the compressed code shift circuit 12 or 13 where the compressed code is shifted, and the decoder 15 decodes the shifted compressed-code.

10 Claims, 26 Drawing Sheets

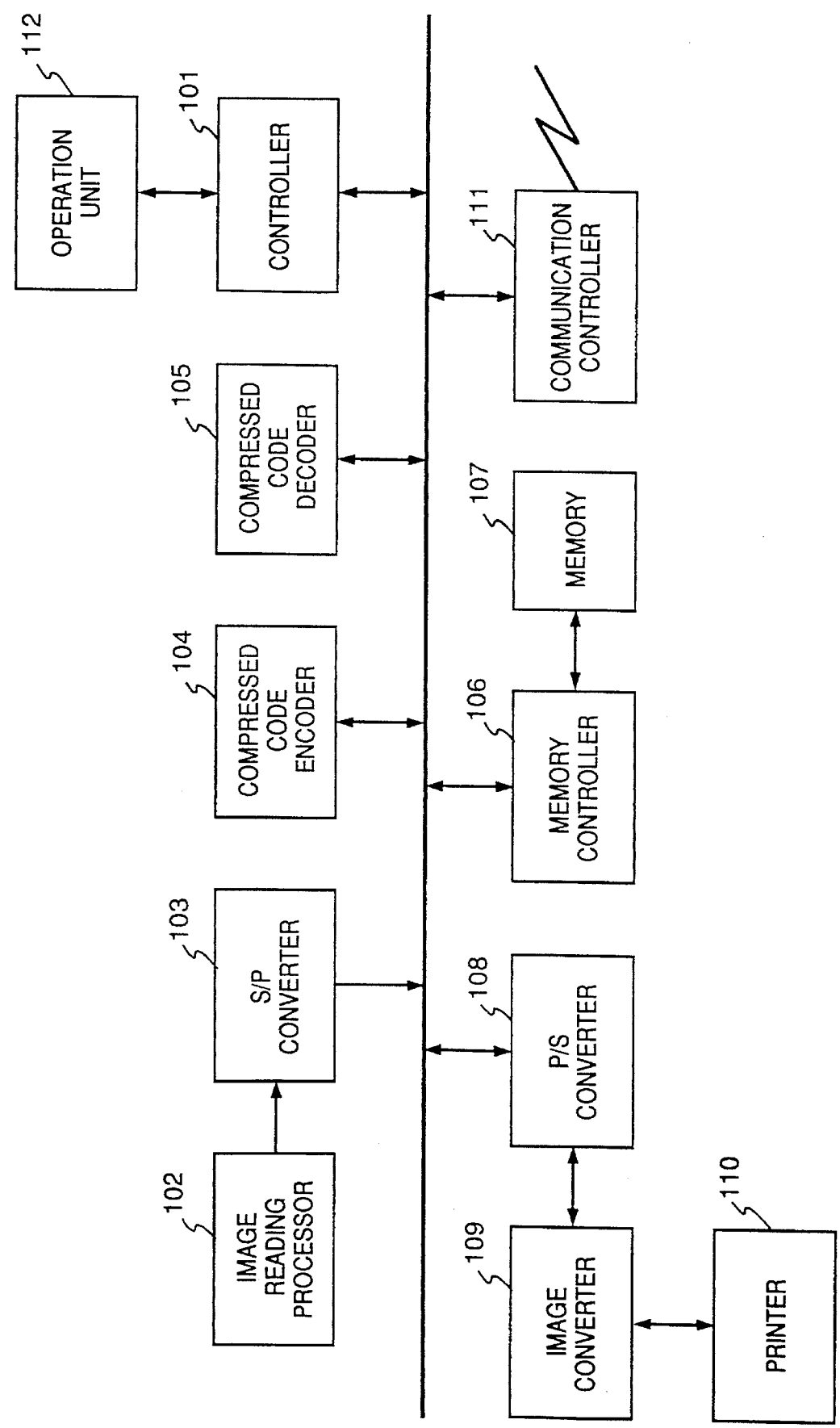

READ IMAGE

HEADER ADDITION
EXAMPLE 1

HEADER ADDITION
EXAMPLE 2

APPARATUS FOR PROCESSING MULTIPLE IMAGES IN ALTERNATING FASHION

BACKGROUND OF THE INVENTION

The present invention relates to an image processing apparatus, and more particularly, to an image processing apparatus capable of performing a compressed code decoding processing or image data encoding processing in time division by multiple processing.

Conventionally, G3 facsimile apparatuses have been widely used in offices and have become a necessary item in office automation. Its functions have been expanded, and, a user can choose a desired apparatus from a wide price range. The transmission rate has been also increased and an apparatus in which transmission rate is over 20 kbps has been developed.

Furthermore, ISDN, a digital communication network, has started to replace telephone communication lines and G4 facsimile apparatuses capable of connecting to an ISDN are gradually increasing. Features of G4 facsimile apparatuses include a high resolution of 400 dpi and the capability of high-speed communication at 64 kbps.

On the other hand, it became possible to use ordinary paper for a facsimile apparatus and a number of facsimile apparatuses using a high-resolution printer, such as a laser printer or ink-jet printer, have been developed. Accordingly, a high-quality image can be transmitted at a high speed due to the high-speed communication capability of G4 apparatuses and the output of the laser printer at high resolution.

Since a laser printer is a type of a page printer which outputs one page at a predetermined rate, an image needs to be output in real time. Accordingly, a page buffer which stores raw image data of one page is required depending on the rate of the image data processing such as compressed code decoding processing. Furthermore, an apparatus which is devoid of a page buffer for raw image data has been developed by adopting a unit which processes the compressed code decoding processing in real time.

Furthermore, users' demand in rapid access has been increased, resulting in development of an apparatus capable of reading 30 pages (3.85 mm/line) per minute. Accordingly, facsimile transmission can be executed by quick response and it has become an attractive function for the users.

A function such as multi-access or dual access has been developed thereby providing better operation for the users. In a facsimile connected to the ISDN, the "multi-access" function refers to the following functions:

(1) Transmission can be carried out while a reception is in progress; and
(2) Reception can be carried out while a transmission is in progress. The "dual-access" function refers to the following functions:
  (1) Transmission reservation can be carried out while a transmission or reception is in progress; and
  (2) Copying or transmission reservation can be carried out during a memory transmission.

However, the facsimile apparatus having a printer such as a laser beam printer, a page printer, performs encoding into a compressed code or decoding the encoded compressed-code on a plurality of pages simultaneously. These processings need to be done rapidly, resulting in complication in the construction or control, and an increase in cost.

SUMMARY OF THE INVENTION

Accordingly, it is an object of the present invention to provide an image processing apparatus having a multi-access or dual access function capable of executing compressed code decoding processing or image data encoding processing in a multiple processing environment, at high speed, with a simple construction or control.

According to the present invention, the foregoing object is attained by an image processing apparatus comprising: first input means for inputting a compressed code; second input means for inputting a compressed code; selection means for selecting one of the compressed codes which are respectively inputted by the first and second input means; and decoding means for decoding the compressed code selected by the selection means.

It is another object of the present invention to provide an image decoding method and apparatus capable of performing a decoding processing in a multiple processing environment, at high speed, with a simple construction or control and a small memory capacity.

It is another object of the present invention to provide an image decoding method and apparatus which is not limited by software processing speed caused by an increased load.

Furthermore, it is still another object of the present invention to provide an image encoding method and apparatus capable of performing an encoding processing to cope with the multi-access or dual access and high-speed communication or rapid access with a simple construction or control and a buffer having a small capacity.

According to the present invention, the foregoing objects are attained by an image encoding apparatus which encodes input image data to compression data, comprising: storage means for storing image data inputted in line unit; first encoding means for encoding image data stored in said storage means to a compressed code in accordance with a first synchronizing signal; second encoding means for encoding image data stored in said storage means to a compressed code in accordance with a second synchronizing signal; and selection means for selecting one of the first and second encoding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 9 is a block diagram illustrating the construction of a facsimile apparatus in a third embodiment;

DESCRIPTION OF THE PREFERRED EMBODIMENTS

Preferred embodiments of the present invention will now be described in detail in accordance with the accompanying drawings.

THE FIRST EMBODIMENT

The general construction of the first embodiment is described below.

Figure 1:
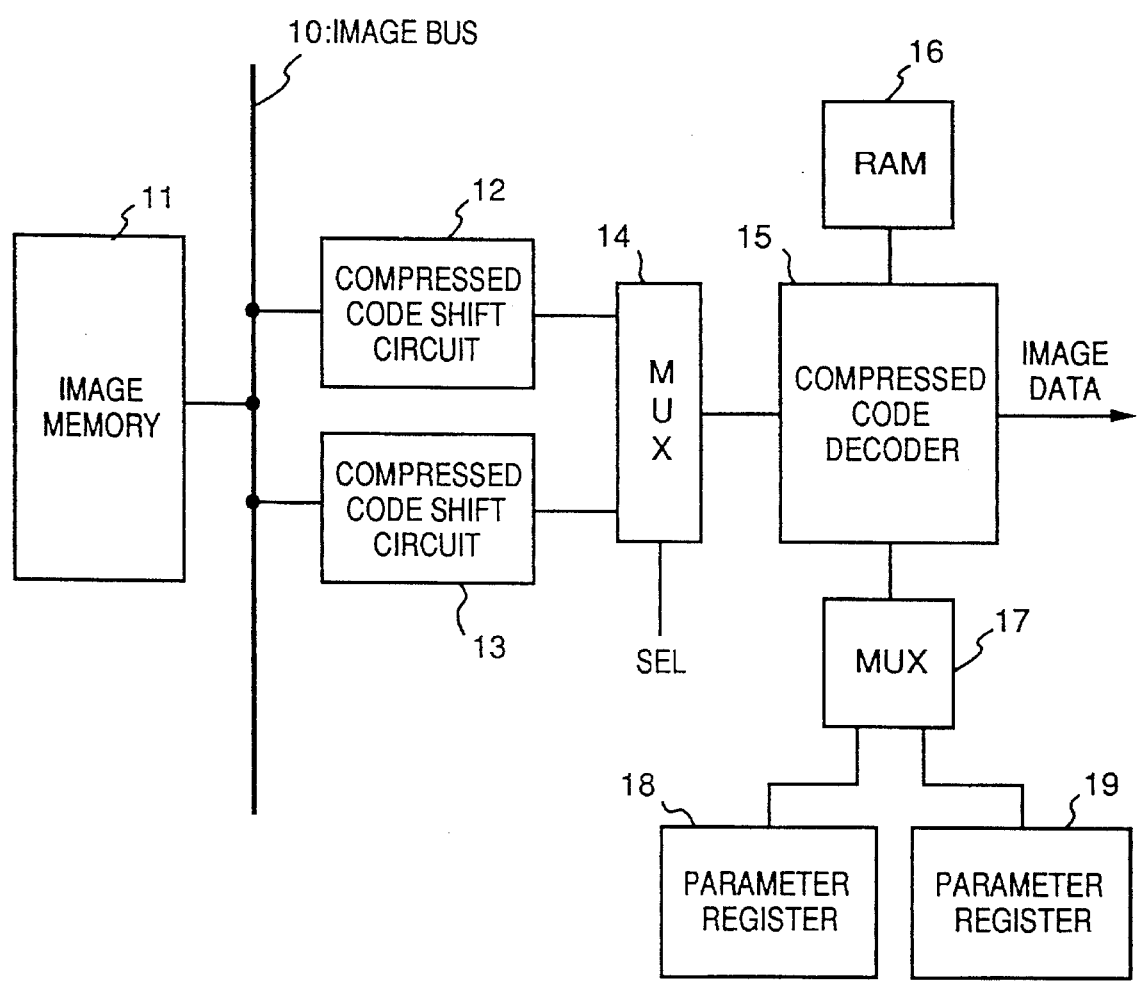
FIG. 1 is a block diagram illustrating the construction of a compressed code decoding apparatus in a first embodiment.

FIG. 1 is a block diagram illustrating the construction of the compressed code decoder according to the first embodiment. In FIG. 1, numeral 10 is an image bus, numeral 11 is an image memory comprised of a semiconductor memory and a memory controller. Numerals 12 and 13 are compressed-code shift circuits (shift circuits) comprised of a barrel shifter-register. The shift circuits 12 and 13 read out compressed-code data from the image memory 11 and shift the compressed code in accordance with a shift instruction output from a compressed-code decoder 15 (which is described later). Numeral 14 is a multiplexer (switcher) which selects a compressed-code string output from the shift circuits 12 and 13, and outputs the selected string to the decoder 15. The decoder 15 decodes the compressed code from the compressed-code string output from the multiplexer 14, and outputs the decoded image data and the number of code shifting, with respect to the shift circuit, obtained based on the decoding result. Numeral 17 is a multiplexer which selects a parameter output from the parameter register 18 or 19 and outputs the selected parameter to the decoder 15.

The compressed code shift circuits 12 and 13 are described below.

Figure 2:
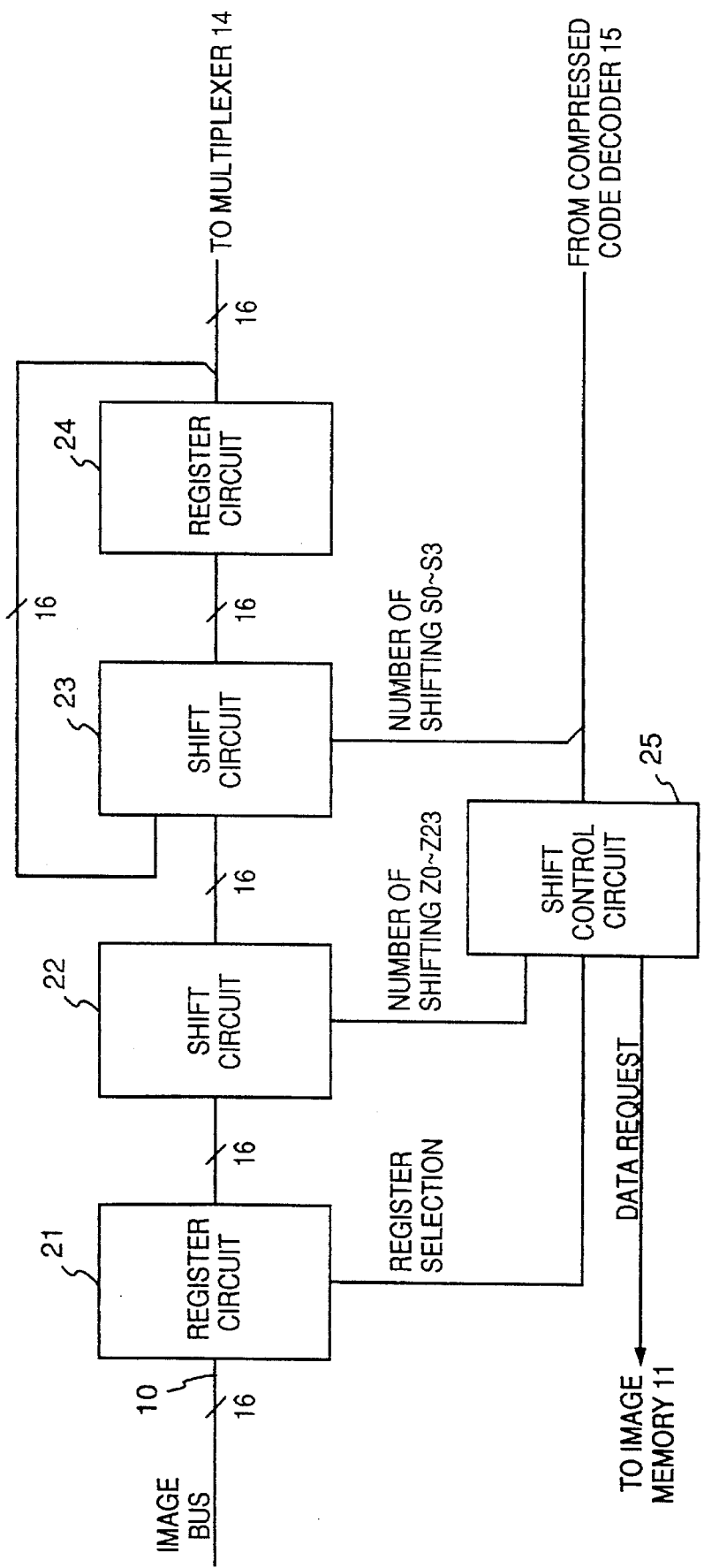
FIG. 2 is a block diagram illustrating the construction of a typical compressed code shift circuit according to the first embodiment.

FIG. 2 is a block diagram illustrating the construction of a typical compressed code shift circuit according to the embodiment. In FIG. 2, numerals 21 and 24 are register circuits, numeral 22 and 23 are shift circuits, and numeral 25 is a shift control circuit.

The operation of the compressed code shift circuit of FIG. 2 is described.

When the shift control circuit 25 sends a request for data to the image memory 11, the image memory 11 outputs the compressed code being packed in 16 bits to the image bus 10. This compressed code is taken into the register circuit 21 to which a register selection signal is supplied from the shift control circuit 25. The shift circuit 22 shifts the bit position of the 16-bit data input by the register circuit 21 in, accordance with the signal indicating the number of code shifting from the shift control circuit 25, and outputs it to the shift circuit 23. Accordingly, the bit positions of the 16-bit data can be changed in the shift circuit 23 by changing the number of code shifting of the shift circuit 22. The 16-bit data output from the shift circuit 23 is input into the register circuit 24, and further to the multiplexer 14 via the register circuit 24. The output of the register 24 is also input into the shift circuit 23. The data representing the code length of the decoded compressed code from the compressed code decoding apparatus 15 is supplied to the shift circuit 23 as a signal indicating the number of code shifting. In this way, data other than the code data which have been already decoded, among the 16-bit data output from the register circuit 24 to the multiplexer 14, is taken and stored into the shift circuit 23.

Figure 3:
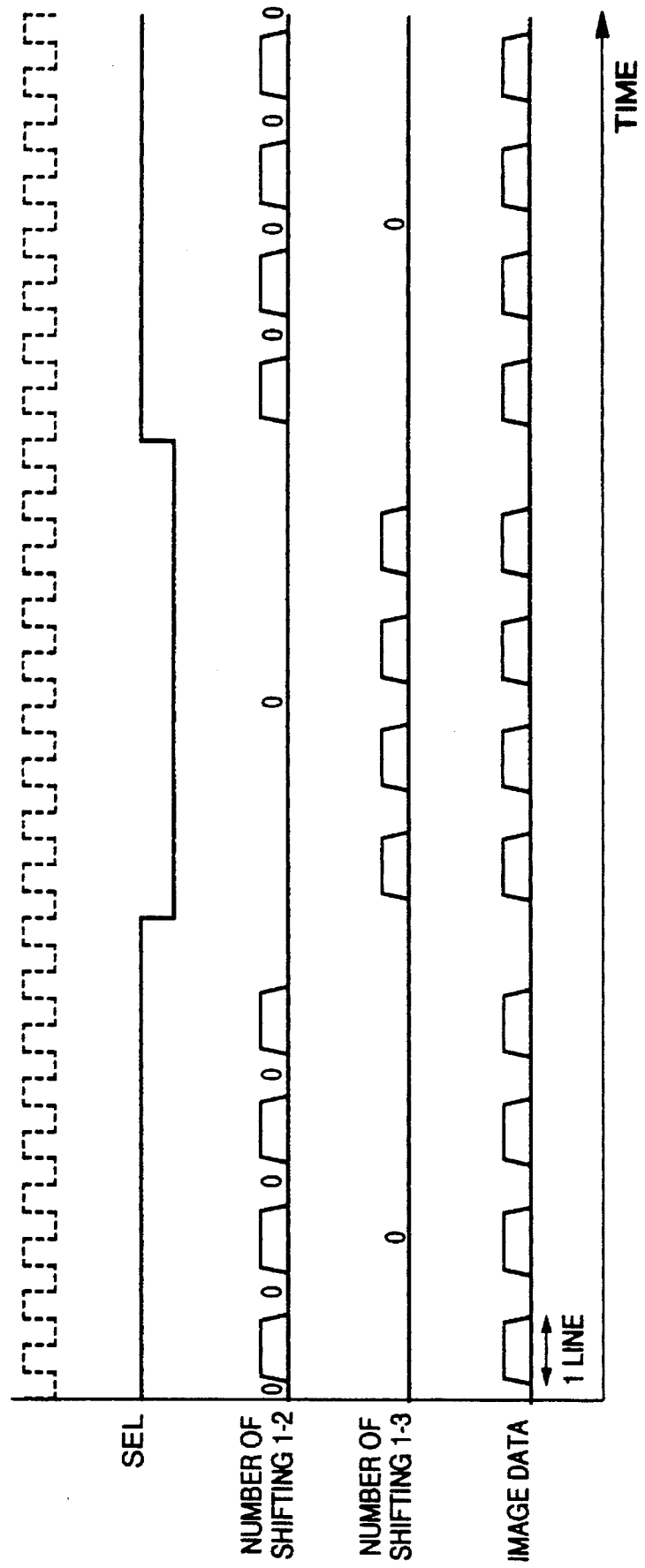
FIG. 3 is a timing chart of switching the decoding processing in line unit by using the compressed code shift circuits 12 and 13.

FIG. 3 is a timing chart of switching the decoding processing in each line unit by using the compressed code shift circuits 12 and 13.

As shown in FIG. 3, decoding is operated such that the MUX 14 is switched in each line unit and the decoder 15 reads out the compressed code from each shift circuit. Since MH, MR, and MMR codes can be divided into one-line unit, the decoding processing can be restarted in line units. Accordingly, when the code of the next line is maintained in the shift circuits 22 and 23, the decoding processing can be restarted even once the processing has been interrupted.

The MH, MR, and MMR codes are variable length codes and their line division is recognized when codes have been actually decoded. Accordingly, an interruption and a restart of the decoding processings can be easily performed by maintaining the shifted code-information while the compressed codes are decoded sequentially.

As described above, according to the embodiment, the compressed code decoding process for a plurality of pages of code data can be carried out in time division by multiple procesing, by supplying the plurality of pages of code data in the image memory 11 to different code shift circuits in page unit, and the interruption and restart of the decoding processing can be easily performed by maintaining the interrupted compressed code information in line unit. Still further, since the compressed code shift unit is constituted by a simple arrangement with a register and a shifter, high-speed processing can be performed without the load with respect to the size or complication of circuits.

SECOND EMBODIMENT

In the second embodiment, a plurality of image data can be synthesized in a main scanning direction by performing the decoding processing by switching the shift means in line units.

Figure 4:
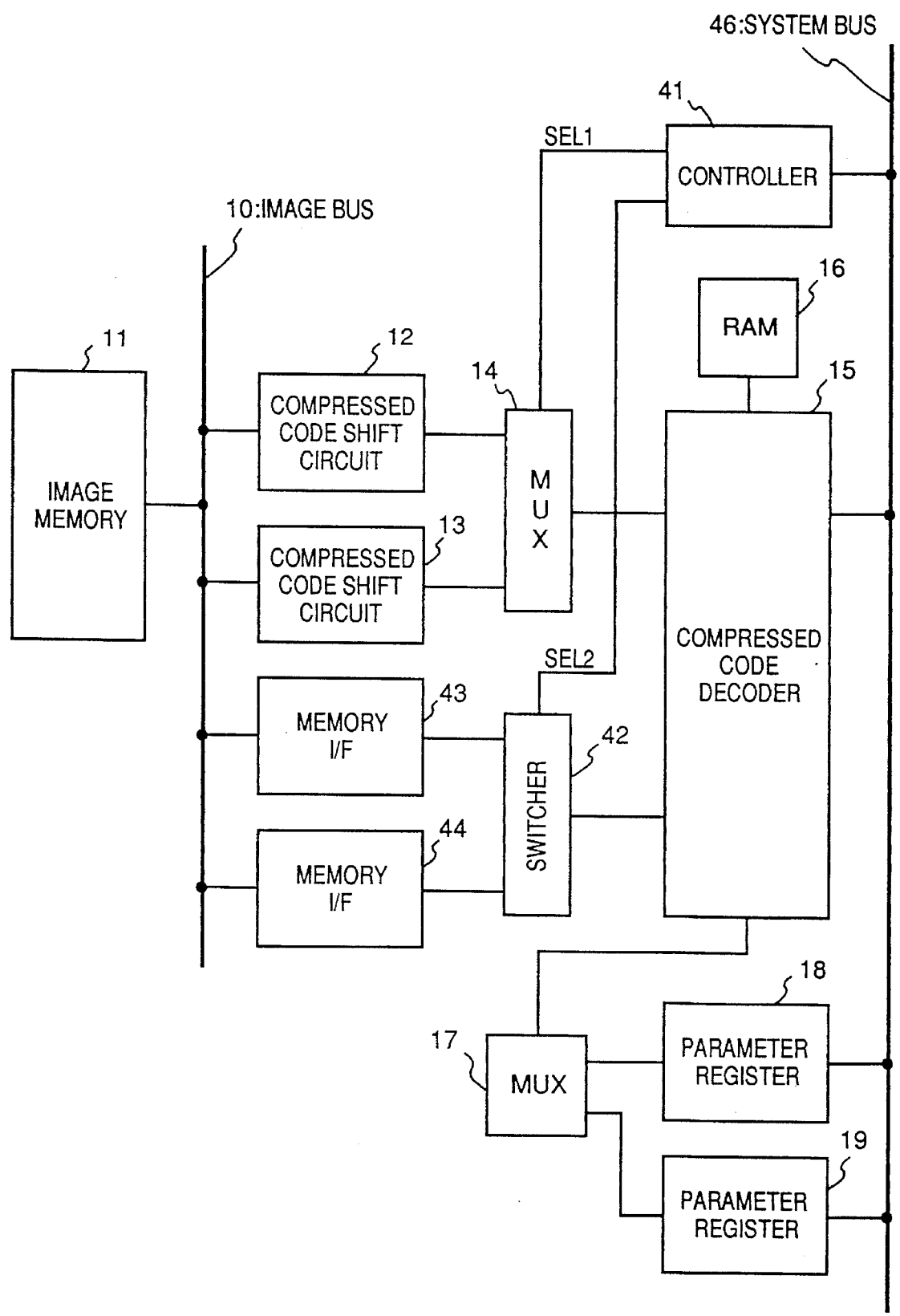
FIG. 4 is a block diagram illustrating the construction of the compressed code decoding apparatus in a second embodiment.

FIG. 4 is a block diagram illustrating the construction of the compressed-code decoder according to the second embodiment. The portions which are identical to those of FIG. 1 have the same reference numerals and the description is not needed.

In FIG. 4, numeral 41 is a controller such as a microcomputer circuit comprised of CPU, ROM, RAM, clock IC, I/O, CG ROM, and DMAC.

The controller 41 controls operations and various data by software control of the microcomputer. Numeral 42 is a switcher which outputs the decoded raw image data, which has been output by the decoder 15, to either the memory interface 43 or 44. The memory interfaces 43 and 44 store the raw image data input via the switcher 42 into the image memory 11.

With the above arrangement, the operational control of synthesizing image data is described below.

Figure 5:
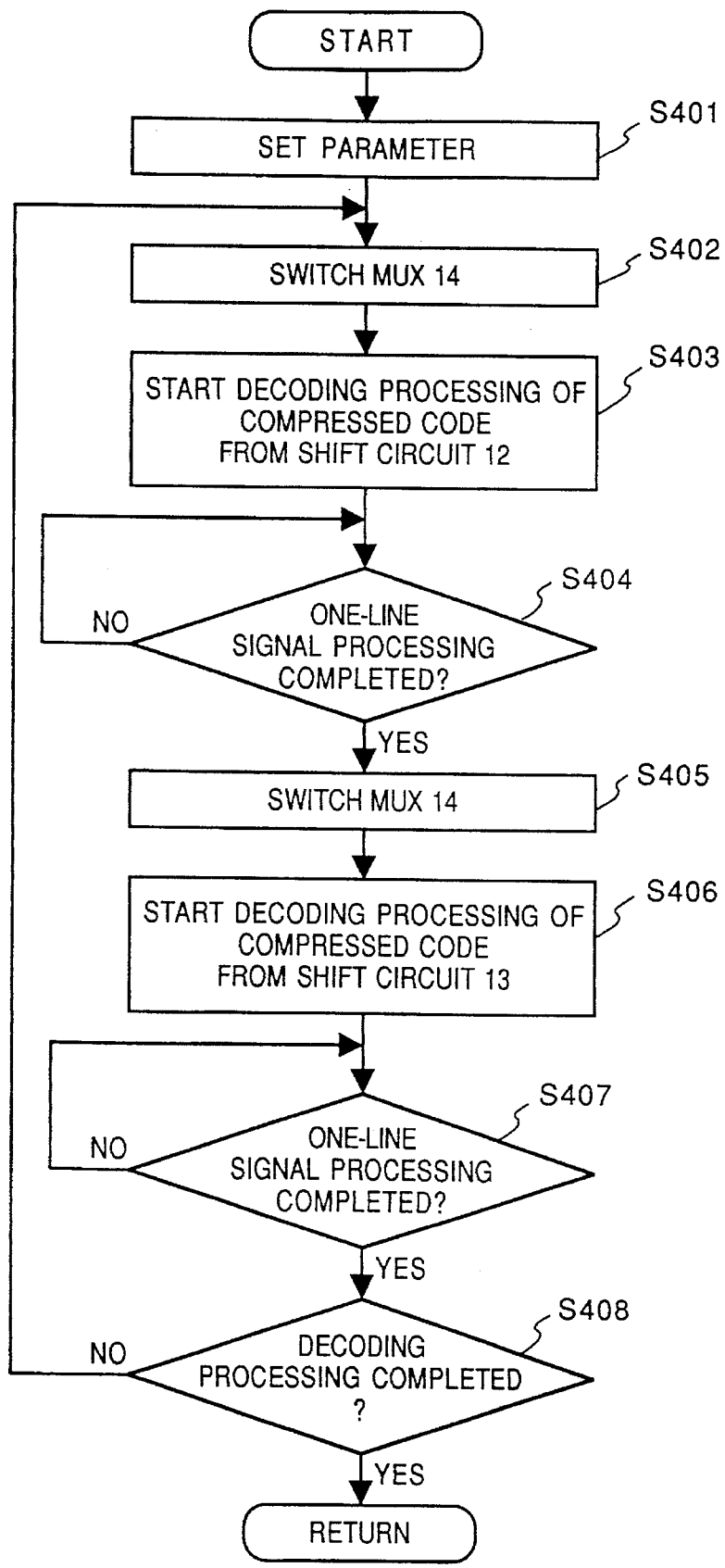
FIG. 5 is a flowchart which explains the operation control according to the second embodiment.

FIG. 5 is a flowchart which explains the operational control according to the second embodiment.

At step S401, parameters are set for each unit. In this operation, since data of two pages is integrated into data for one page in the main scanning direction, the compressed code to be read are in two systems, and the decoding operation is performed by switching the multiplexer 14. On the other hand, the raw image data to be stored is in a single system and stored in the image memory 11 by using a single memory interface without switching the switcher 42. Accordingly, the parameter set is performed on a parameter of two types of the image data to be decoded (parameter registers 18 and 19) and a parameter of a signal memory interface. At step S402, the multiplexer 14 is switched, and at step S403, the decoding operation of the compressed-data stored in the shift circuit 12 is started. At step S404, the completion of the decoding processing of one line is detected, and the multiplexer 14 is switched at step 405. Subsequently, at step S406, the decoding processing of the compressed code stored in the compressed code shift circuit 13 is started. At step S407, the completion of the decoding processing of one line is detected, and the process proceeds to step S408, if the processing continues, the process returns to step S402.

The process of storing the compressed code and raw image data in the image memory 11 is described.

Figure 6:
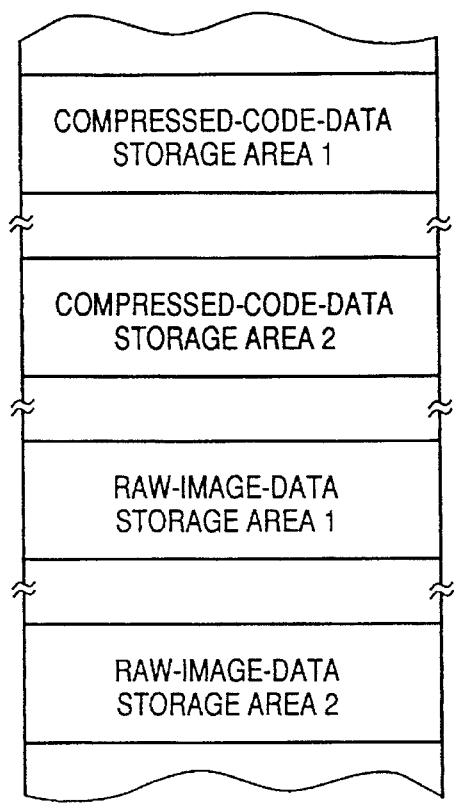
FIG. 6 shows the state where raw image data compressed codes are respectively stored in each memory in the second embodiment.
Figure 7:
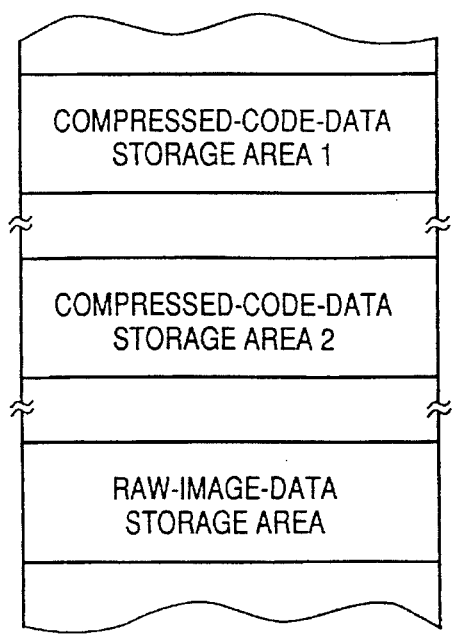
FIG. 7 shows the state where the raw image data decoded in the second embodiment are synthesized and stored.
Figure 8A:
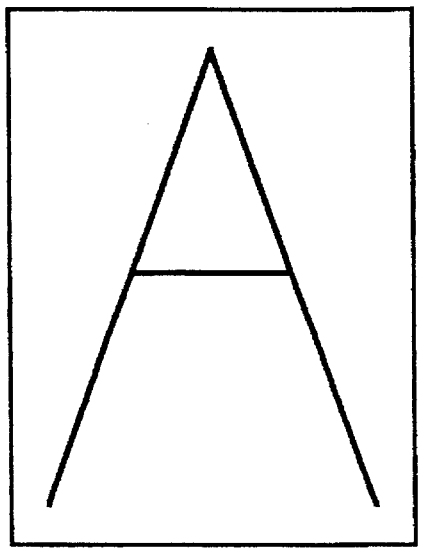
FIGS. 8A–8C show an example where the two image data are synthesized in the second embodiment.
Figure 8B:
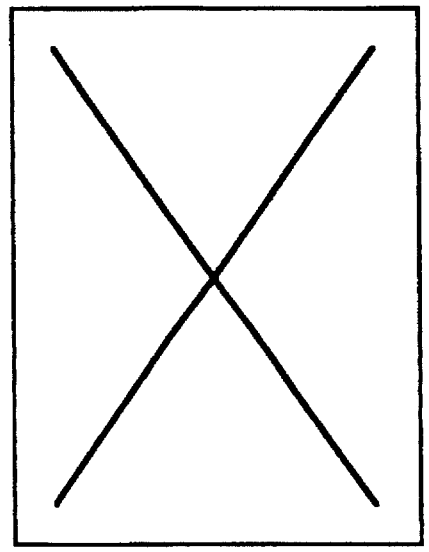
Figure 8C:
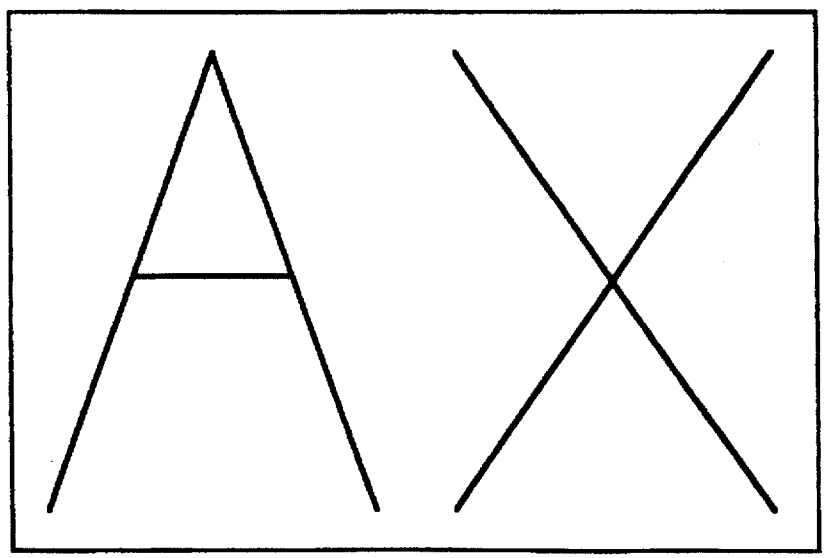

FIG. 6 shows the allocation of memory where the raw image data and the compressed code are respectively stored in memories by using two memory interfaces. FIG. 7 shows the allocation of memory where the decoded raw image data is synthesized and stored. FIGS. 8A–8C show an example where two image data are synthesized.

As shown in FIG. 6, the compressed code data which serves as internal data are stored in compressed code data storage areas 1 and 2, respectively. The decoded raw image data are stored in raw image data storage areas 1 and 2.

When the decoded raw image data are synthesized and stored, as shown in FIG. 7, only a single raw image data storage area is required.

It is assumed that two image data such as the images shown in FIGS. 8A and 8B are to be synthesized. When the above images are synthesized, a single image as shown in FIG. 8C is formed.

By the above control, the image data of two pages can be integrated into the image data of one page. Although it is not shown in this embodiment, a plurality of image data can be integrated by using a plurality of compressed-code shift circuits in the similar arrangement to the second embodiment.

As described above, according to the embodiment, the compressed-code decoding processing on the plurality of pages can be performed in the time division and by multiple processing by supplying the compressed code for the plurality of pages stored in the image memory 11 to a compressed-code shift circuit which differs for each page.

THIRD EMBODIMENT

FIG. 9 is a block diagram illustrating the construction of the facsimile apparatus in the third embodiment.

In FIG. 9, numeral 101 is a controller which is a microcomputer comprised of CPU, ROM, RAM, clock IC, I/O, CG ROM, and DMAC. The controller 101 controls the operation of the entire apparatus and various data by software control of the microcomputer. Numeral 112 is an operation unit comprised of various keys and a display unit. The operation unit 112 generates key input from an operator and displays various information. Numeral 102 is an image reading processor which is comprised of a CCD, an A/D conversion circuit, and an image processing circuit. The image reading processor 102 performs an image processing such as an optical/electrical conversion, A/D conversion, image correction, and binarization processing on the data read optically. Numeral 103 is a serial-parallel (S/P) converter which converts serial image data input from the image reading processor 102 into parallel data.

Numeral 106 is a memory control circuit, which is comprised of DMAC and timing control circuit, and controls transmission/reception of data between the memory and each unit by mediating read or write access requests from each unit to the memory. Numeral 107 is a memory which serves as a storage apparatus comprising of dynamic memory, and a semiconductor memory, and stores various data.

Numeral 104 is a compressed-code encoder which reads out the raw image data stored in the memory 107, encodes into the compressed code such as MH, MR, and MMR codes of the CCITT Recommendation, and stored the encoded code-data in the memory 107. Numeral 105 is a compressed-code decoder which reads the code data stored in the memory 107, decodes it to be the raw image data, and stores the decoded raw image data in the memory 107 again.

Numeral 108 is a parallel-serial (P/S) converter which reads out the raw image data stored in the memory 107, converts the parallel data into serial data, and outputs the serial data to the image converter 109. The image converter 109 performs image processing such as smoothing processing and enlargement/reduction processing on the image data inputted by the P/S converter 108, and outputs to the printer 110. The printer, 110 is a printer such as a laser printer or LED printer, which prints the image data output from the image converter 109. Numeral 111 is a communication controller, which is comprised of a line interface and telephone communication circuit, performs the control of reception/transmission of image data/communication control data, or the control of calling/receiving in telephone communication.

The general decoding processing in the third embodiment is described with reference to FIG. 10.

Figure 10:
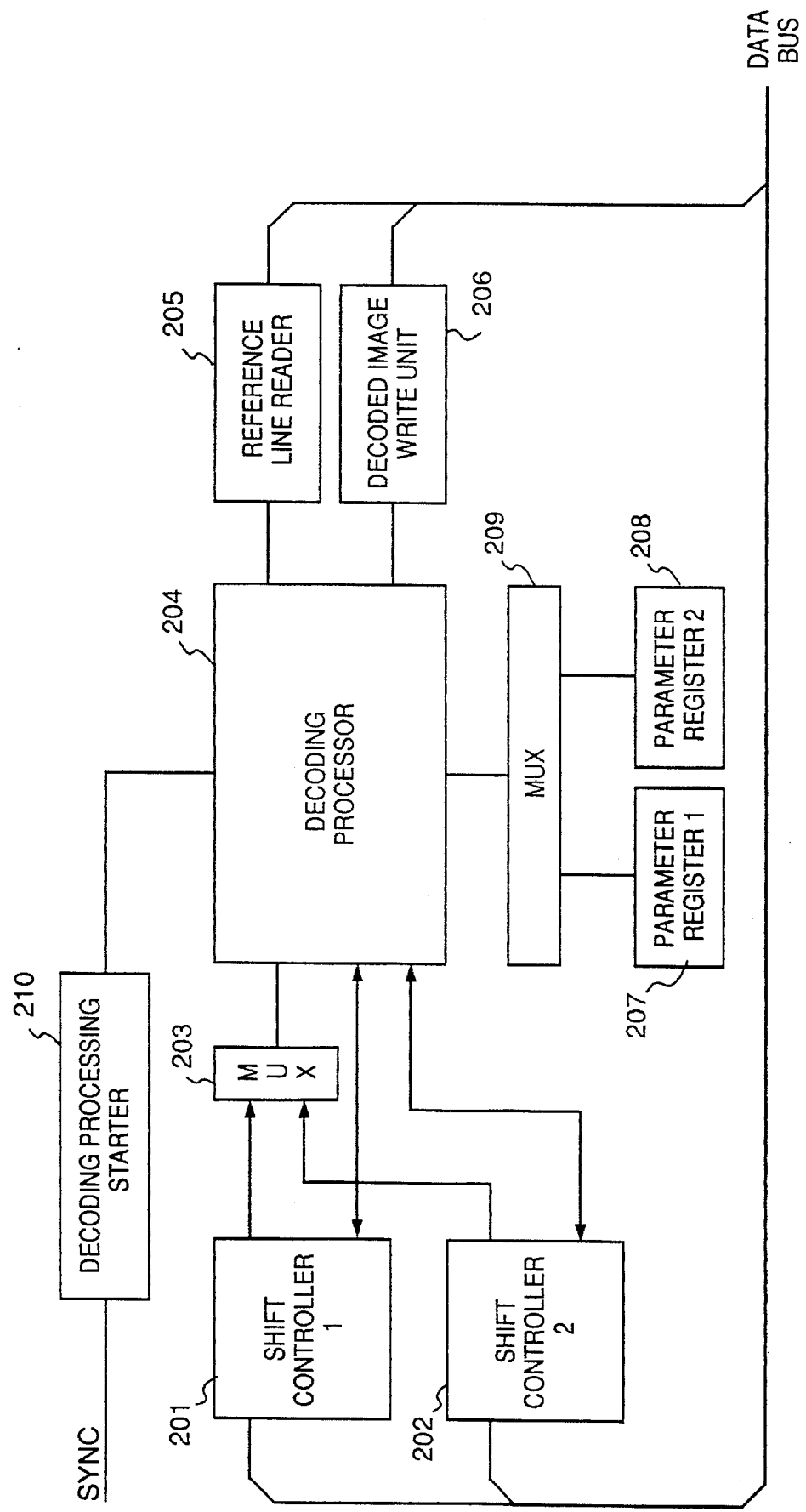
FIG. 10 is a block diagram illustrating the construction of the compressed code decoding apparatus of FIG. 9.

FIG. 10 is a block diagram illustrating the detailed construction of the decoder 105. In FIG. 10, numerals 201 and 202 are shift controllers, each of which is comprised of a barrel shifter-register. Their construction is disclosed in Japanese Kokai No. Sho 62-136131. Each of the shift controllers 201 and 202 reads out the compressed-code data from the memory 107 and shifts the compressed code in accordance with the shift instruction which is output from a decoding processor 204. Numeral 203 is a multiplexer MUX (switcher) which selects a string of the compressed code output from either the shift controller 201 or 202, and outputs the selected string to the decoding processor 204. The decoding processor 204 is a compressed code decoding processor constructed as disclosed in Japanese Kokai Nos. Sho 60-175306 through 60-175311. The decoding processor 204 decodes the compressed code from the compressed code string which is output from the multiplexer 203 and outputs the decoded image data and the number of code shift to the shift controller 201 or 202 based on the decoding result.

Numeral 209 is a multiplexer which selects the parameter output from the parameter registers 207 and 208. Numeral 205 is a reference-line reader which reads raw image data to be a reference line from the memory, converts the data to the serial data, and outputs the serial data to the decoding processor 204. Numeral 206 is a decoded image write unit which converts serial raw image data decoded by the decoding processor 204 into parallel data and stored in the memory 107. Numeral 210 is a decoding processing starter which starts the decoding processing for one line with respect to the decoding processor 204 by a line synchronizing signal output from the image converter 109 or a synchronizing signal generated internally.

The operation of switching the decoding processing in each line unit is described with reference to FIGS. 11–13.

Figure 11:
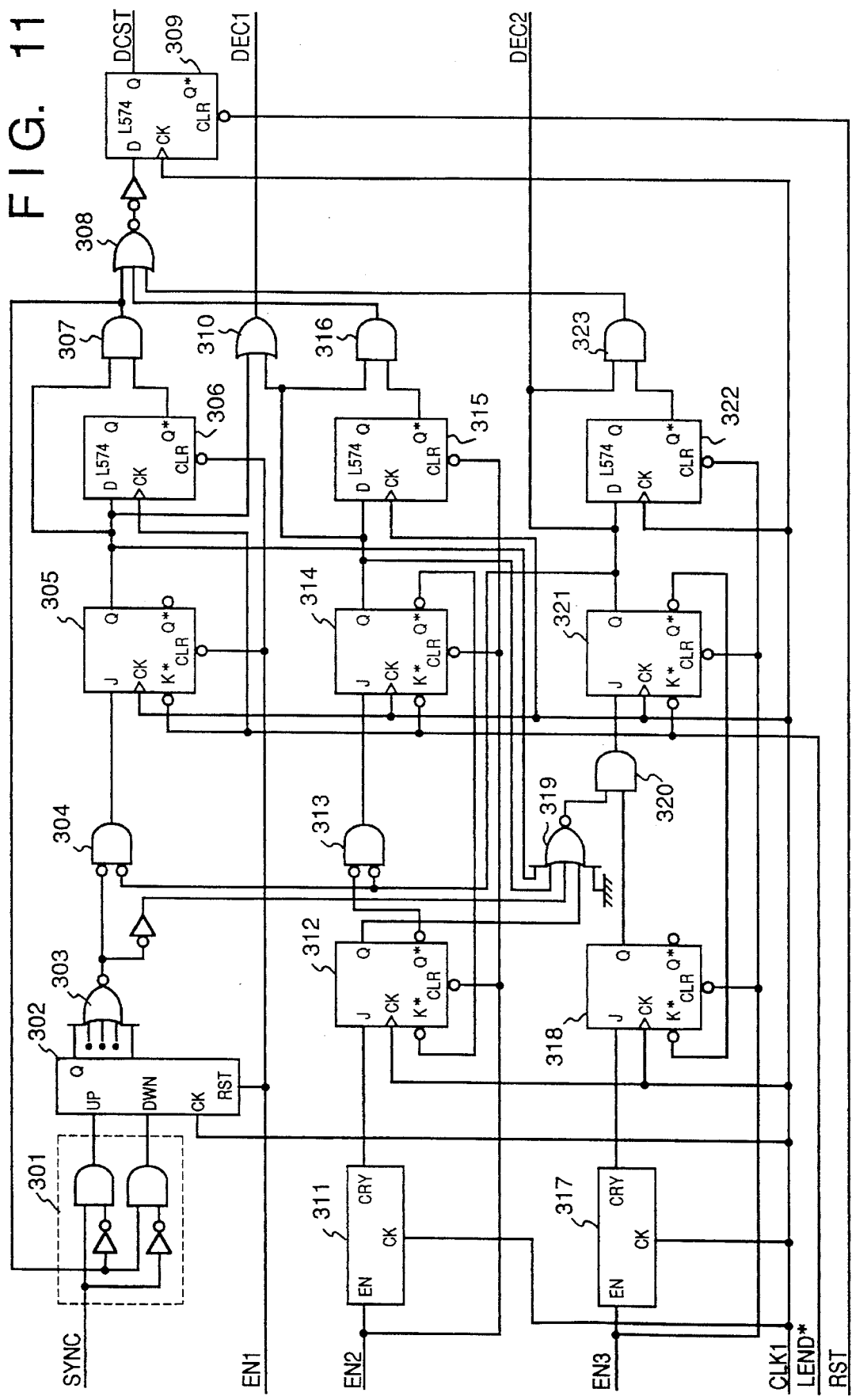
FIG. 11 is a circuit diagram illustrating the detailed construction of a decoding processing starter of FIG. 10.

FIG. 11 is a detailed circuit diagram of the decoding processing starter 210. Signals EN1 and EN2 are signals which start the decoding processing (hereinafter referred to as "processing DEC1") by inputting the data from the shift controller 201 and the parameter register 207 by the decoding processor 204. The signal EN1 enables the start of the decoding processing in accordance with a signal SYNC which is an external synchronizing signal input by the image converter 109. The signal EN2 enables a decoding processing start signal generated by counter means. Signal EN3 is a signal which starts the decoding processing (hereinafter referred to as "processing DEC2") by inputting the data from the shift controller 201 and the parameter register 208 by the decoding processor 204. Similar to the signal EN2, the signal EN3 enables the decoding processing start which is generated by the counter means.

Figure 12:
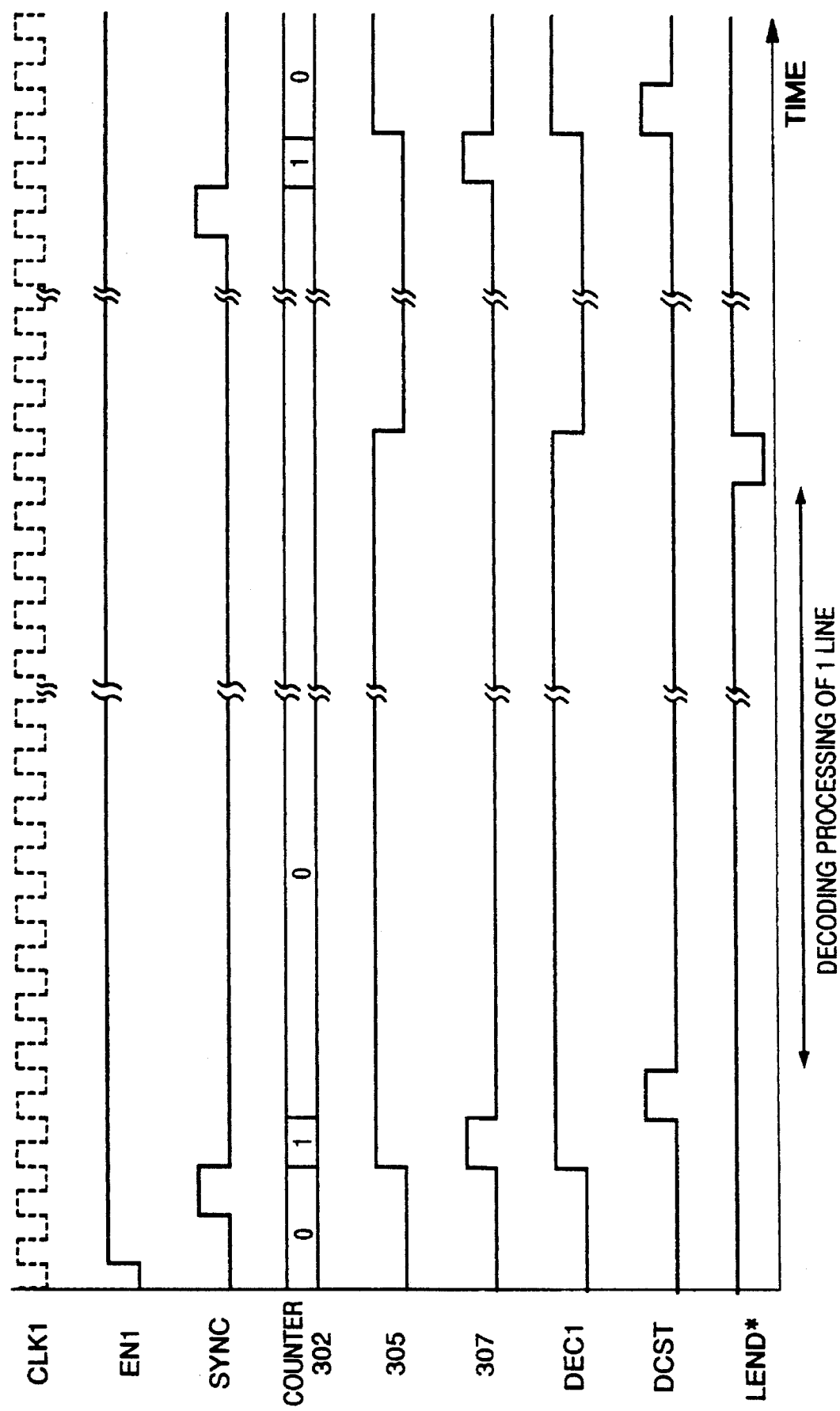
FIG. 12 is a timing chart showing a one-line decoding processing.

FIG. 12 is a timing chart illustrating the state where the decoding processing is executed in accordance with the signal SYNC when the signal EN1 is set to an "enable" state. The operation is described with reference to this timing chart.

A signal SYNC is a line synchronizing signal output from the image converter 109. For example, when a printer 110 is a laser printer, the signal SYNC is generated by a synchronizing signal (a beam detect signal) generated in each line unit by detecting the position of laser scanning in a predetermined interval. Accordingly, as shown in FIG. 12, the signal SYNC is input into a decoding processing starter 210 in the predetermined interval. In FIG. 12, when the signal SYNC is input, the counter 302 is incremented by the gate 301. When the counter 302 indicates an output other than "0", a JK flip-flop 305 becomes "on" via the gate 304. This signal is output to the decoding processor 204 as a signal DEC1 which selects the processing DEC1 via the gate 310. Pulses are generated via a flip-flop 306 and gates 307 and 308, while a single pulse of a signal DCST, a decoding processing start signal for one line, is output. The output of the gate 307 decrements the counter 302 via the gate 301. In the decoding processor 204, the DEC1 is started by the input of the signal DCST. After that, when the decoding of one line of the DEC1 has been completed, a signal LEND* is output. The decoding processing starter 210 which has received the signal LEND* sets the JK flip-flop 305 to the "OFF" state, thus disabling the signal DEC1.

Figure 13:
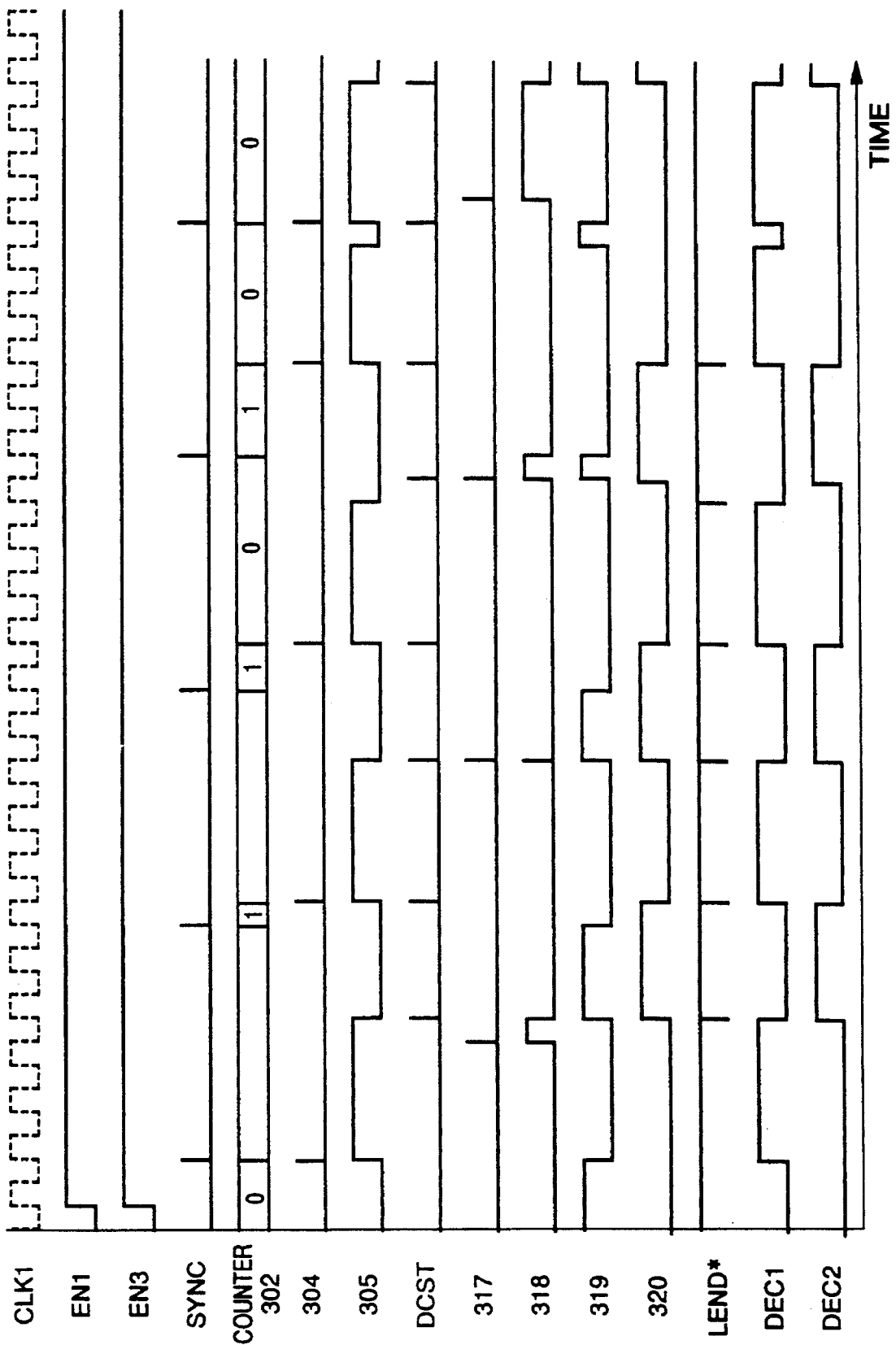
FIG. 13 is a timing chart when a decoding processing is switched between two processing and the switched processing is executed.

FIG. 13 is a timing chart indicating the state where the signals EN1 and EN3 are both set to the "enable state" and the decoding processing is executed in accordance with the signal SYNC and carry outputs from the counter 317. With reference to this timing chart, the state where the decoding processing is executed is by switching the signals DEC1 and DEC2.

As shown in the timing chart, the carry output of the counter 317 is generated in a predetermined interval. The flip-flop 318 maintains the carry output of the counter 317 and sets a JK flip-flop 321 to "on" via the gate 320. This signal is output to the decoding processor 204 as a signal DEC2. When this signal is in the "on" state, the DEC2 is selected. Furthermore, pulses are generated via the flip-flop 322 and the gates 323 and 308. A single pulse of the signal DCST, which is a decoding processing start signal of one line, is output via the flip-flop 309. The output of the JK flip-flop 321 sets the JK flip-flop 318 to the "OFF" state. The decoding processor 204 starts the signal DEC2 by the input of the signal DCST. When the decoding of one line of the DEC2 is completed, a signal LEND* is output and the decoding processing starter 210 sets the JK flip-flop 321 to "OFF", thus disabling the signal DEC2.

When the signals EN1 and EN3 are both enable, as shown in FIG. 13, the decoding processing of the DEC1 and DEC2 are executed in time division. Switching of the DEC1 and the DEC2 is performed by the means of disabling each synchronizing signal by the gates 304 and 319, respectively. The gate 304 disables the output of the gate 303 while the flip-flop 321 is enable. The signal DEC1 cannot be enabled while the output of the flip-flop 321, the signal DEC2, is enable. The gate 319 disables the output of the JK flip-flop 318 while at least one of the outputs from the flip-flop 305, 312 and 314 and the gate means 303 is enable, so that the JK flip-flop 320 cannot be enable.

In this way, it is controlled so that, while one decoding processing is being executed, other decoding processing cannot be executed. Furthermore, it can be set so that the DEC1 has priority over the DEC2 by inputting the outputs of the gate 303 and JK flip-flop 312 into the gate 319. Still further, the signal EN2 is also used when the DEC1 is synchronized with the carry output of the counter 311 and its operation is similar to that of the signal EN3.

Figure 14:
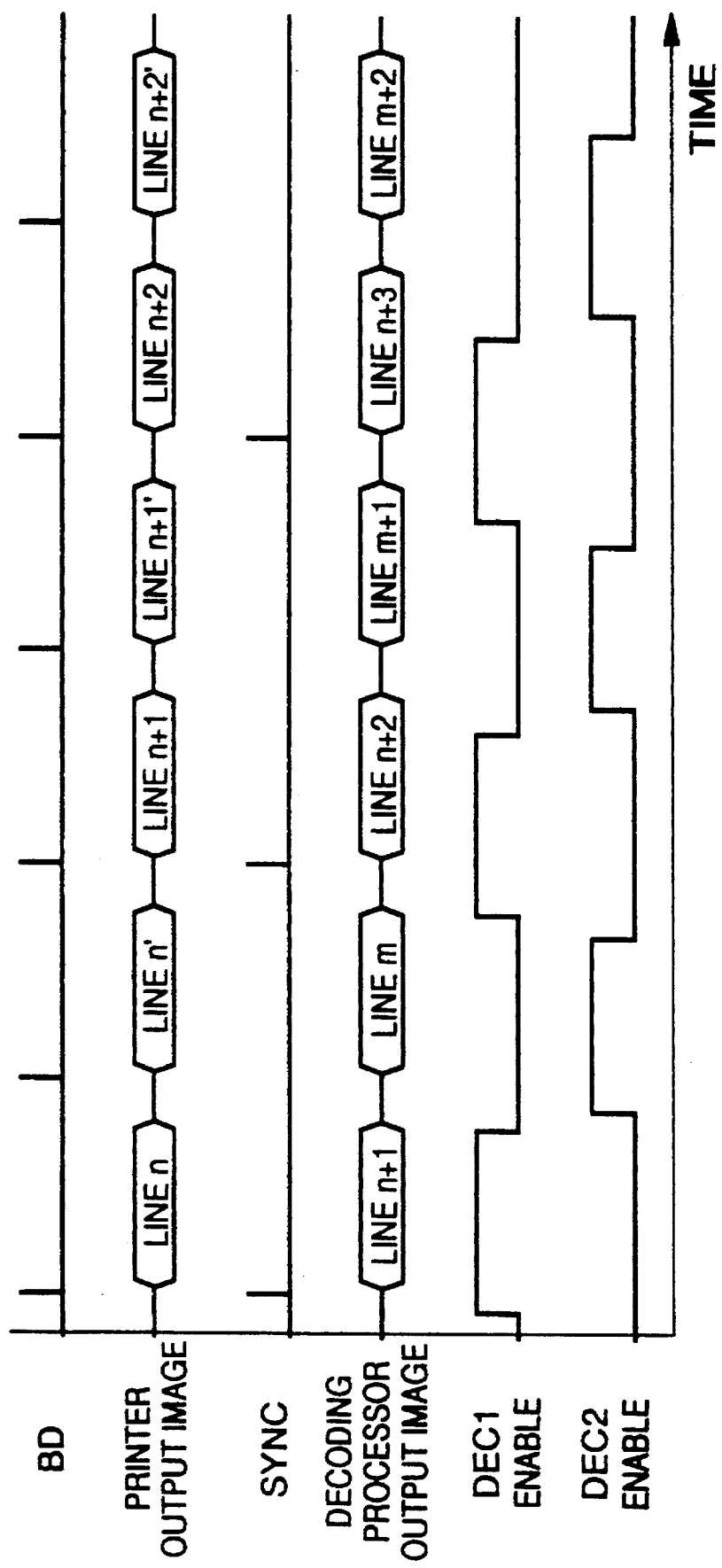
FIG. 14 is a timing chart indicating the timing of printing output and decoding processing.

The timing of the printing output and decoding is described by using the timing chart of FIG. 14. In FIG. 14, the resolution of the image data to be decoded is set to 200×200 dpi and the resolution of the printer 110 to 400×400 dpi.

A BD signal is a synchronizing signal which is generated in each line unit by laser scanning at a predetermined interval. The image converter 109 outputs an image to the printer 110 in accordance with the synchronizing signal. The signal SYNC is obtained thinning the BD signal by selecting every other signal and outputted to the compressed-code decoder 105. The state where the (subject) is synchronized with the signal SYNC and the decoding processing is started by the decoder 105 has been described earlier. Accordingly, the image converter 109 outputs the image data of two lines, to the printer 110, with respect to a single line of the image data inputted by the decoder 105. The image converting processing is, for example, a well-known smoothing processing.

In this way, a synchronizing signal is inputted into the decoder 105 in accordance with the case of image conversion and only a small memory area in the memory 107 where the raw image data is stored is required by performing the decoding processing in synchronism.

Figure 15:
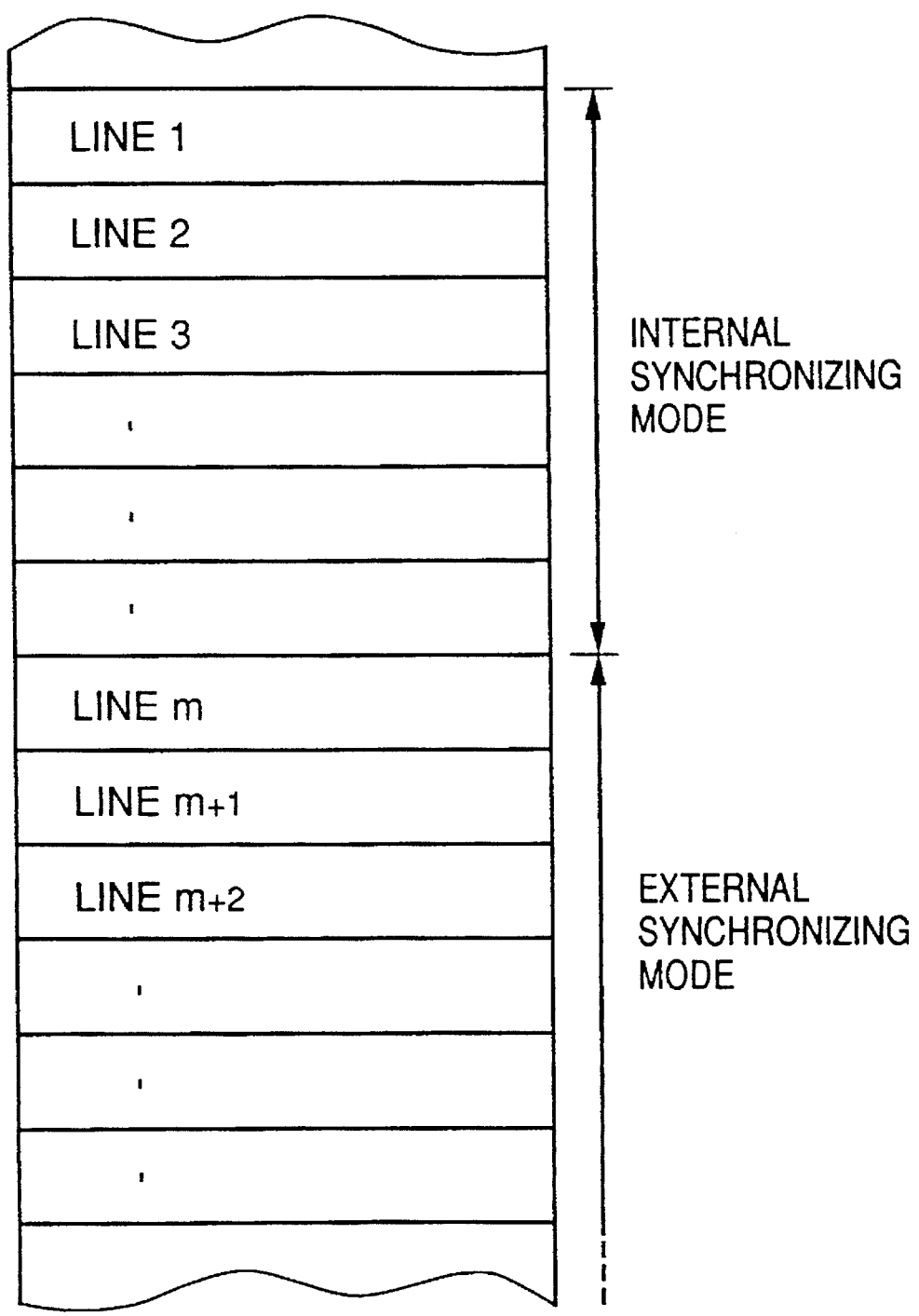
FIG. 15 shows a memory map when a decoding processing is switched between two processings and the switched processing is executed.

As shown in FIG. 15, the first image data for output can be generated without the synchronizing signal from the printer in a manner such that the first several pages of the image data is set to the internal synchronizing mode (the decoding processing is executed by enabling the signal EN3) and the rest is to the external synchronizing mode (the decoding processing is executed by enabling the signal EN1).

According to the present embodiment, the decoding processing is executed by synchronizing with the printing operation of each line with respect to the high-speed printing of the page printer, since the compressed-code decoding processing of one line is started in synchronism with the signal obtained by thinning the line synchronizing signal outputted from the page printer in accordance with the case of image conversion, and the speed in a decoding processing time which differs based on line in the image memory at the internal synchronizing mode can be buffered.

In a compressed-code decoding apparatus, speed buffer is performed by including means for storing the number of lines on which the decoding processing has not been processed (unprocessed lines), increasing (or decreasing) the number of the unprocessed line by one by an input line synchronizing signal, and increasing (or decreasing) the number of unprocessed line by the start or completion of the one-line decoding processing.

The compressed-code decoder, which decodes the compressed-code data stored in the image memory and stores the decoded raw image data, is coped with various operations by including means for starting the decoding processing in accordance with an input line synchronizing signal and means for starting the encoding processing in accordance with a synchronizing signal generated by the count means, and by executing the decoding processing by selecting each of the above means.

Furthermore, the image data for print output which is required to be in a real time processing can be decoded at high speed, since the decoding processing with respect to a single input means is allotted to an output image of the printer, the decoding processing is started by selecting the line synchronizing signal inputted from the printer and the synchronizing signal generated by the count means, and the decoding processing allotted to the output image has priority over other processings.

As described above, according to the third embodiment, the decoding processing can be executed in multiple processing at high speed with a simple construction or control and a small storage capacity.

FOURTH EMBODIMENT

Figure 16:
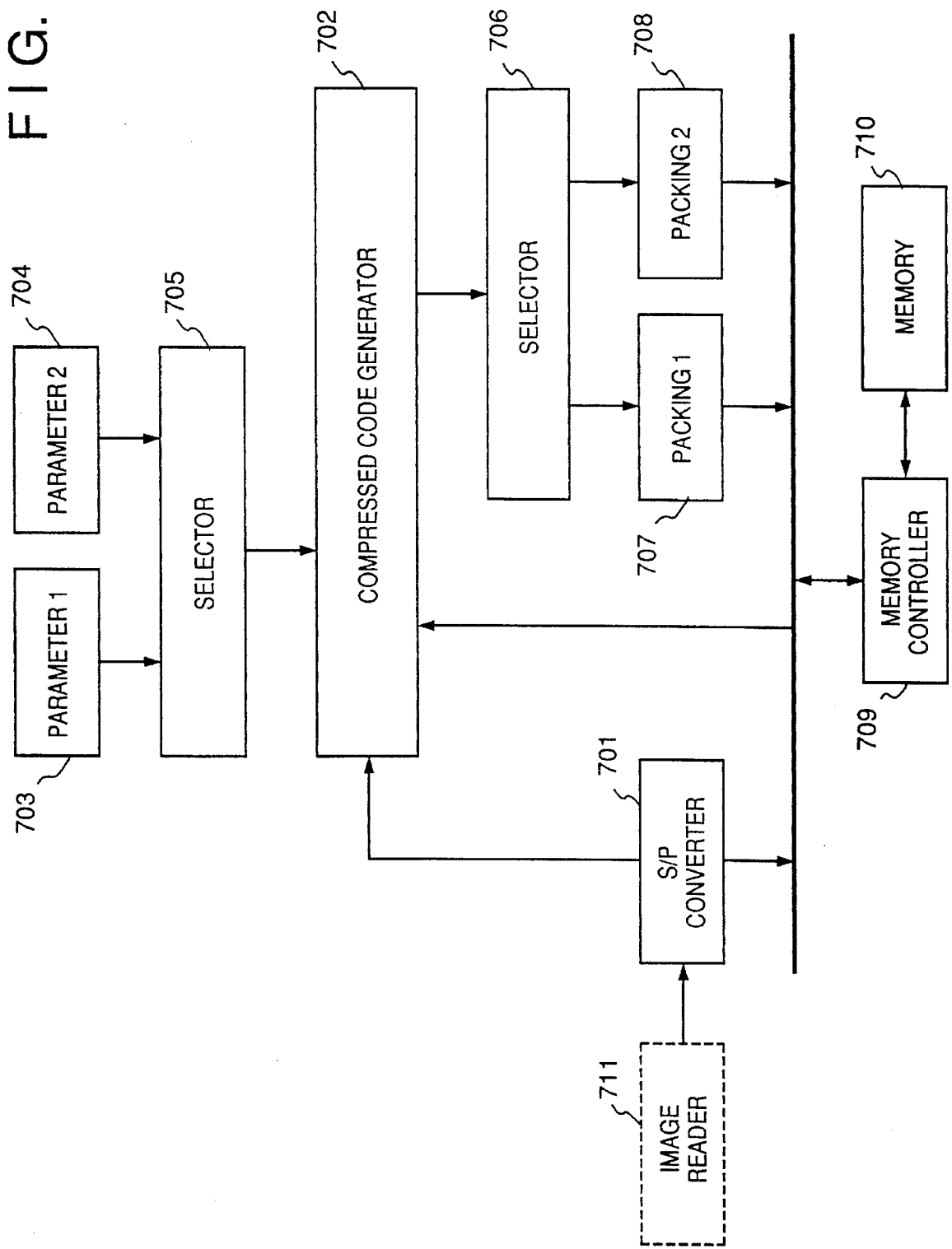
FIG. 16 is a block diagram illustrating the construction of the apparatus in a fourth embodiment.

FIG. 16 is a block diagram illustrating the construction of the image encoder in the fourth embodiment.

In FIG. 16, numeral 701 is a serial-parallel (S/P) converter which converts serial-input image data to parallel data. The converted parallel data is stored in the memory 110 via the memory controller 709. The memory controller 709 comprising of a DMA controller and timing controller writes the data transmitted from each unit into a memory, reads out the data, and transmits the read data to each unit in correspondence to the memory access request transmitted from each unit. Numeral 710 is a memory comprised of a dynamic RAM which stores data in accordance with the memory controller 709.

Numeral 702 is a compressed code generator which reads raw image data stored in a memory 710 via the memory controller 509 and executes an encoding processing. The compressed code data generated by the compressed code generator 702 is such as MMR, MR, or MH code of the CCITT Recommendation whose code length is undefined. The encoded compressed code data is transmitted to a packing circuit 707 or 708 via a selector 706 where the encoded code data is packed in unit of an integral number multiple byte and stored in the memory 710 via the memory controller 709.

Numerals 703 and 704 are parameter storage circuits which respectively store the parameter required by the compressed code generator 702. To determine the value of the parameter, the number of bits in a line to be encoded or the embodiment method can be used. Numeral 705 is a selector which selects Parameter 1 of the parameter storage circuit 703 or Parameter 2 of the parameter storage circuit 704, and outputs the selected parameter to the compressed-code generator 702. Numeral 711 is an image reader which outputs serial image data to the S/P converter 701.

The general operation in the embodiment is described with reference to FIGS. 17 and 18.

Figure 17:
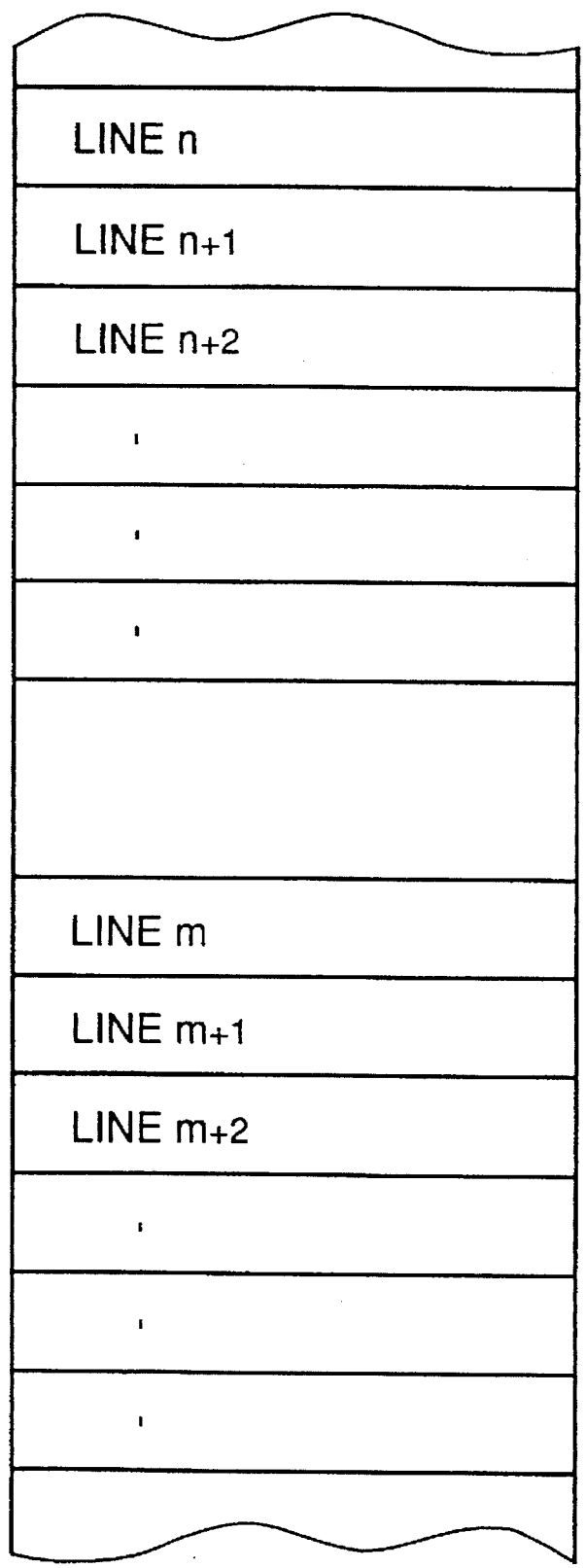
FIG. 17 shows a state where the image data to be coded is stored in a memory.
Figure 18:
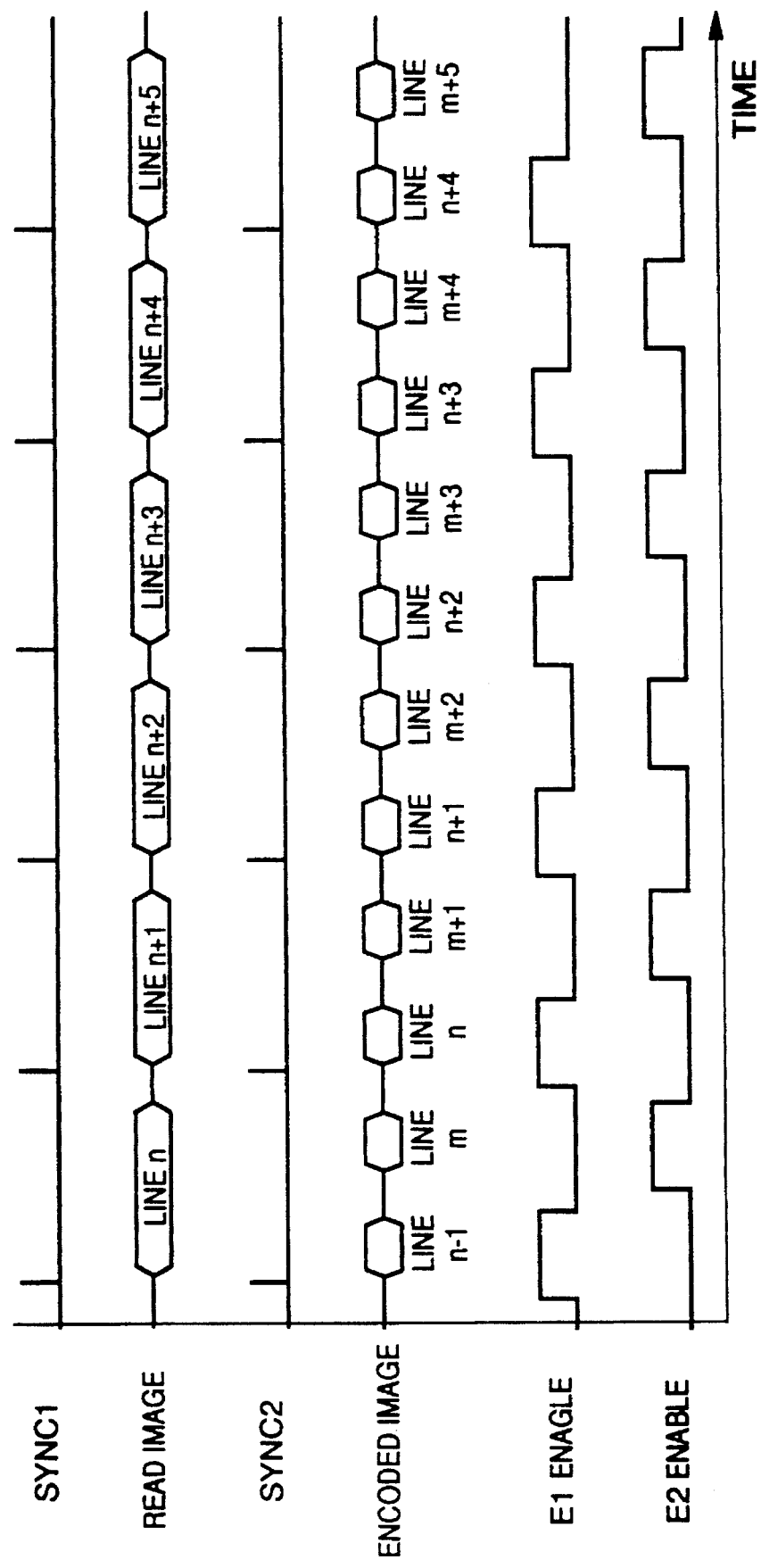
FIG. 18 is a timing chart of switching in line unit and performing during the encoding processing of raw image data.

FIG. 17 shows the image data stored in the memory 710. FIG. 17 shows the state where the image data of two pages is stored. FIG. 18 shows the timing chart of the state where the image data of two pages is encoded in time division.

The signal SYNC1 is a line synchronizing signal outputted from the image reader 711. In accordance with the synchronizing signal, the serial image data is input into the S/P converter 701 and sequentially stored, such as LINE n, LINE n+1, and LINE n+2, in the image memory 710. The synchronizing signal SYNC2 is also a line synchronizing signal generated in the compressed-code generator 702. In accordance with the signal SYNC2, the compressed code generator 702 executes the encoding processing in line unit in the order of LINE m, LINE m+1, LINE m+2, . . . . The parameter needed for the encoding processing is read out in a manner such that the parameters of the parameter storage circuits are switched by the enable signal of the encoding proceeding. Furthermore, the compressed code generated in the compressed code generator 702 is packed and output by selecting either the packing circuit 707 or 708 by the enable signal of the encoding processing 1 or the enable signal of the encoding processing 2.

Figure 19:
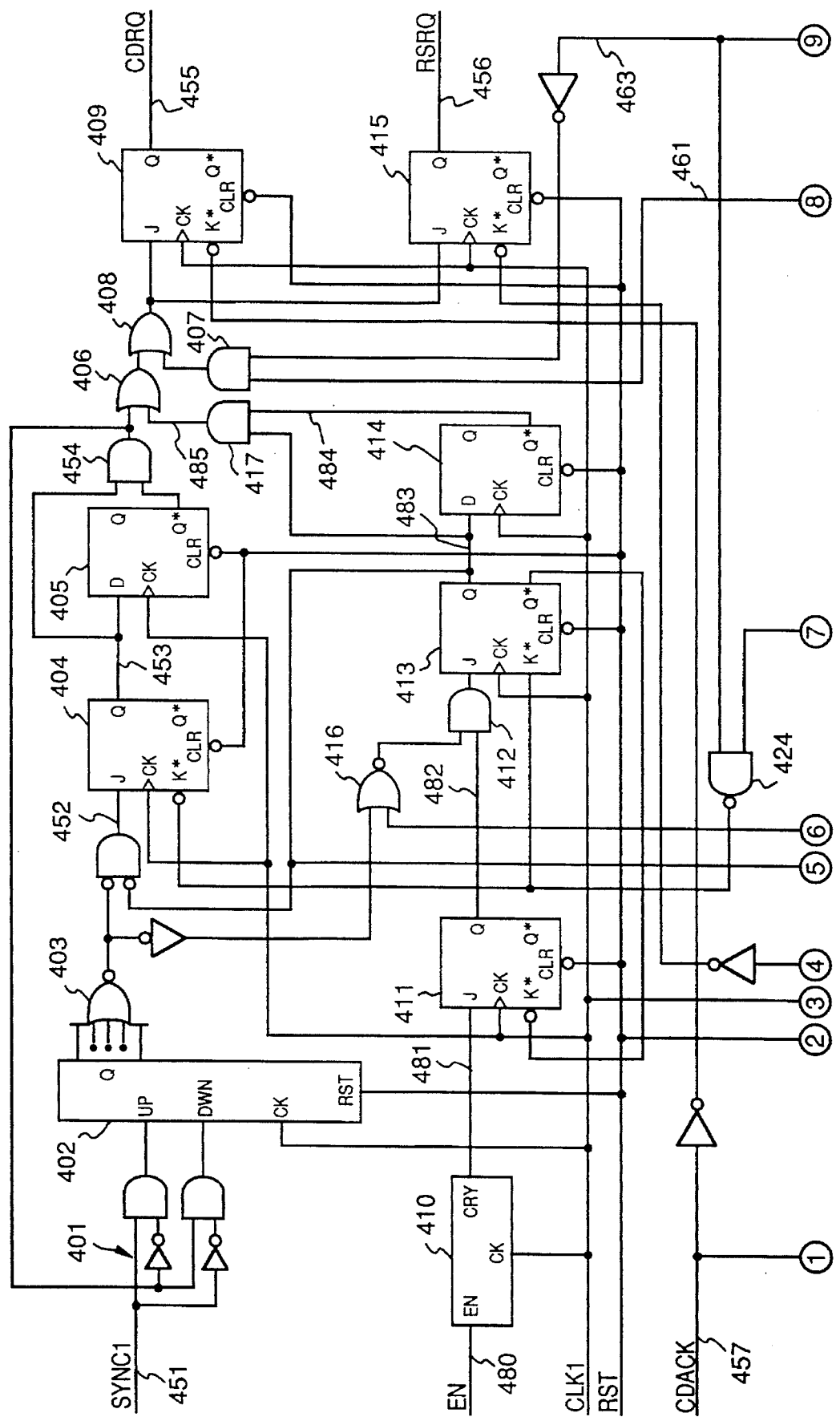
FIG. 19 is a block diagram illustrating the detailed construction of the compressed code generator of FIG. 16.

The processing to switch the encoding processing in each line unit is described with reference to the detailed diagram of the compressed-code generator 702 shown in FIGS. 19 and 20. It is assumed that the encoding processing 1 starts in accordance with the synchronizing signal inputted from the outside, a signal SYNC1 (numeral 451), and the encoding processing 2 starts in accordance with the synchronizing signal which is internally generated, a signal SYNC2 (numeral 481).

Numeral 451 is a signal SYNC1 which is a synchronizing signal inputted from the image reader 111. When a single pulse of this synchronizing signal is inputted, the counter 402 is incremented by one via the gate 401. Accordingly, the output 452 of the gate 403 is set to "ON", and then, the JK flip-flop 404, the signal EX1, becomes "ON". The signal EX1 controls the selector 705 so as to enable Parameter 1 of the parameter storage circuit 703, and the selector 706 so as to operate the packing processing 1 of the packing circuit 707. Numeral 473 is a code data bus and numeral 474 is a bus in which code length is that of the code data. The packing circuits 707 and 708 pack the code data whose code length is undefined in accordance with the code length output from an encoding processor 432. The encoding processor 432 corresponds to the virtual change-point detection circuit of a reference line of the encoder and the portion from the encoding line change-point detection circuit to the packing circuit a as described in Japanese Kokai No. Sho 62-31259.

The signal EX1 is also transmitted to the memory controller 709 and requests to read a coding line which is one line of the raw image data to be encoded and the reference line which is the raw image data to be referred at the encoding processing out of the area stored for the encoding processing 1 in the memory 710. Similarly, the signal EX1 requests to store the encoded code data in the area allotted to the encoding processing 1. The signal EX1 is also input into a D flip-flop 405 and the gate 454 generates a signal devoid of the first one pulse of the signal EX1. This signal decrements the counter 402 via the gate 401 and sets the JK flip-flops 409 and 415 to "ON" via the gates 406 and 408. The output signal 455 (CDRQ) from the JK flip-flop 409 is transmitted to the memory controller 709 and requests the data of coding line. Furthermore, the output signal 456 (RSRQ) from the JK flip-flop 415 is transmitted to the memory controller 709 and requests the data of the reference line. The memory controller 709 enables the signals CDACK (457) and RFACK (458) at the timing capable of reading out the data, and responses to the data transmission request of the signals CDRQ (455) and RSRQ (456). The JK flip-flops 409 and 415 become "OFF" by the above signals. At the same time, the data are respectively stored in the P/S conversion registers 430 and 431.

In the circuit of the embodiment, it is assumed that the response to the signal CDRQ has priority over the response to the signal RSRQ. The signal CDACK is always responded earlier than the signal RFACK. Accordingly, when the data of the reference line is written in the register 431 by the response of the signal RFACK, the data of the coding line has been already stored in the register 430. Furthermore, the data of the coding line and reference line are written in the registers 430 and 431 in 16-bit unit.

By the response of the signal RFACK, the JK flip-flop 420 is set to "ON". Subsequently, the JK flip-flop 421 becomes "ON" and the counter 422 becomes a count-enable state When the value of the counter 422 is "1" the gate output 461 becomes "ON". Subsequently, the JK flip-flops 409 and 415 become "ON" via the gates 407 and 408 so as to request the data of the reference line and the coding line. Furthermore, the output of the JK flip-flop 421 becomes a shift signal to the S/P conversion registers 430 and 431. The S/P conversion registers 430 and 431 output the data loaded by the output signal of the gate 426 in serial to the encoding processing 432.

Figure 21:
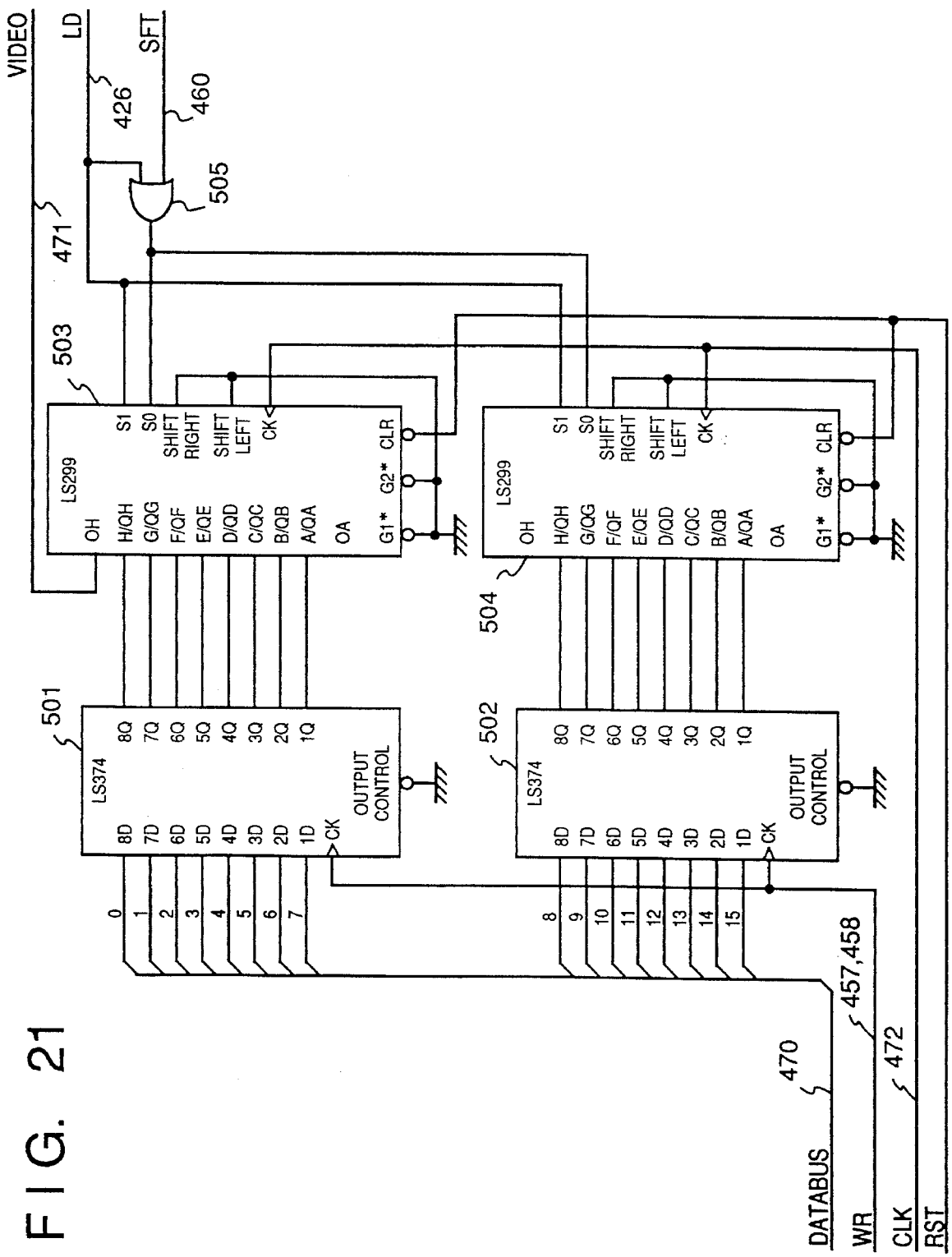
FIG. 21 is a diagram illustrating the detailed construction of the shift register (430 and 431)

FIG. 21 shows the circuit of the S/P conversion registers 430 and 431. Numerals 501 and 502 are 8-bit registers, such as LS374, each of which latches data by inputting a pulse signal 457 or 458. The latched data 470 is stored in the shift registers 503 and 504 capable of parallel input such as LS299. The stored data is converted to the serial data by receiving the signal 460 and transmitted to the encoding processor 432.

Figure 20:
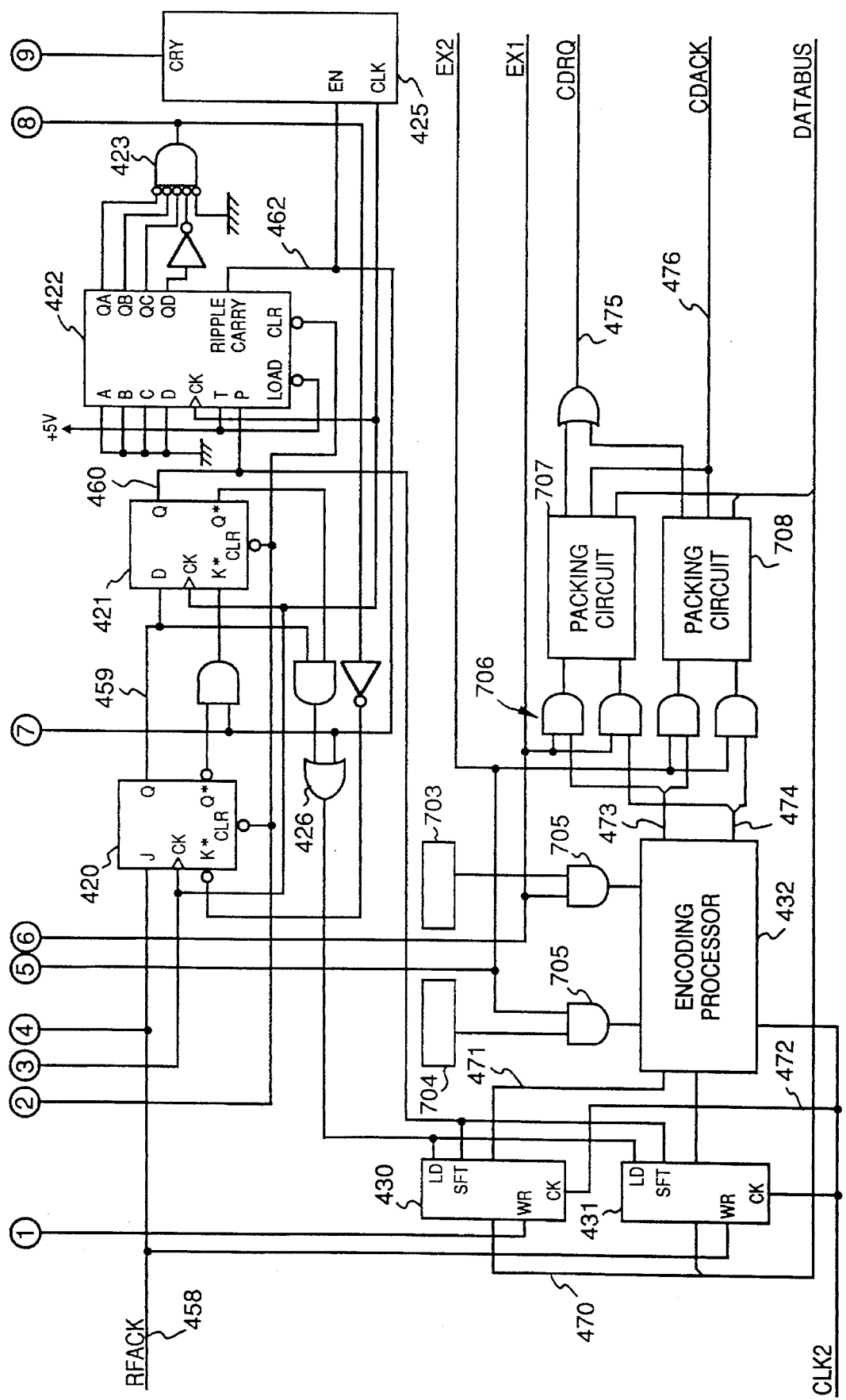
FIG. 20 is a block diagram illustrating the detailed construction of the compressed code generator of FIG. 16.

Referring to FIG. 20, when the carry-up signal 462 of the counter 422 becomes "ON" in every 16-bit unit, the counter 425 is incremented by one. These counters 422 and 425 count the number of bits in each line. Accordingly, when the output signal of the gate 424 (FIG. 19) becomes "ON", the processing of one line ends and the JK flip-flop 404 is turned off.

The encoding processing 2 which starts in accordance with an internally generated synchronizing signal 481 (SYNC2) is described below. Numeral 480 is an enable signal of the counter 410 which is set by the controller (not shown). When the signal 480 (FIG. 19) is "ON", the counter 410 counts a predetermined count value and a carry-up signal, a synchronizing signal 481, is outputted when the counter is incremented. When the synchronizing signal 481 is "ON", the JK flip-flop 411 is "ON". The JK flip-flop signal 413 is turned on via the gate 412 when the gate 403 which outputs the signal OR of the counter 402 is "ON" or when the JK flip-flop 413 is not "ON". That is, when the gate 416 is turned on, the output of the JK flip-flop 411 is prohibited by the gate 412. In this way, the encoding processing 1 which is operated by the line synchronizing signal 1 has priority over other processings. When an unprocessed line which is activated by the line synchronizing signal exists, that line is given the highest priority.

When the JK flip-flop 413 is "ON", the signal EX2 (483) becomes "ON". The signal EX 2 controls the selector 705 and enables Parameter 2 of the parameter storage circuit 704 so that the packing processing 2 of the packing circuit 708 operates. The signal EX2 is also transmitted to the memory controller 709 of FIG. 16 and requests to read the coding line, one line of the raw image data to be encoded, and reference line, the raw image data to be referred at the encoding, out of the area stored for the encoding processing 2 in the memory 710. Similarly, it requests to store the encoded data into the area allotted to the encoding processing 1. The signal EX 2 is also input into the D flip-flop 414 and the gate 475 generates a signal 485 which is devoid of the first one pulse of the signal EX2. This signal turns on the JK flip-flops 409 and 415 via the gates 406 and 408.

The signal CDRQ 455, an output of the JK flip-flop 409, is transmitted to the memory controller 709, and requests the data of the coding line. The signal RSRQ (456), an output of the JK flip-flop 415, is transmitted to the memory controller 709 and requests the data of the reference line. The memory controller 709 responds to the data transmission request of the signals CDRQ and RSRQ by enabling the signals CDACK (457) and RFACK (458) at the timing capable of reading the data. By these signals, the JK flip-flops 409 and 415 are turned off and the data are respectively written into the P/S conversion registers 430 and 431. The rest of the operation is similar to the operation in synchronizing with the line synchronizing signal, described earlier. When the processing of one line is completed, the JK flip-flop 413 is turned off.

As described above, the compressed-code encoding processing of the data which differs based on the line synchronizing signal and internal synchronizing signal is switched in each line unit.

Figure 22:
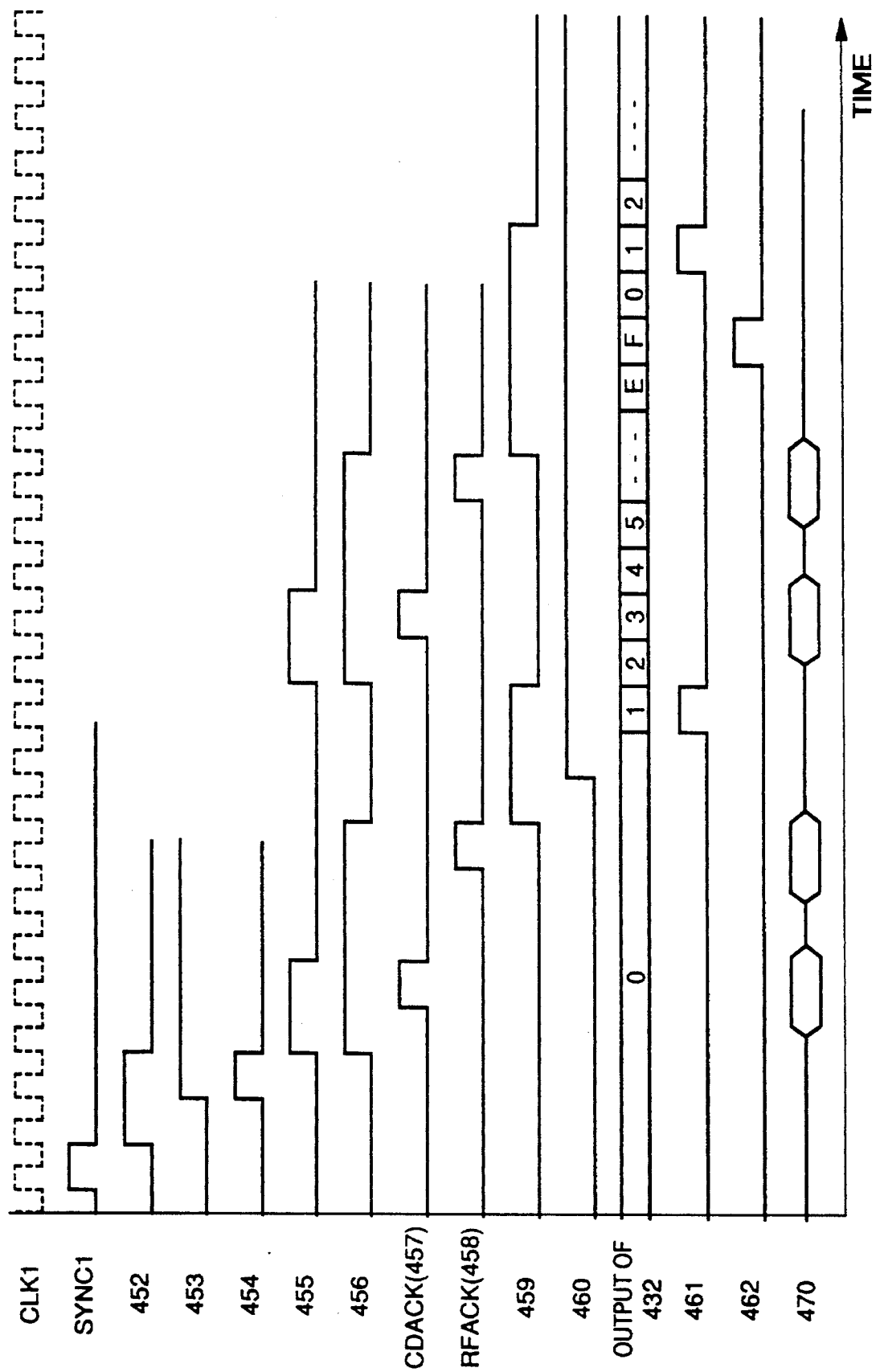
FIG. 22 is a timing chart illustrating the operation of FIGS. 19 and 20.
Figure 23:
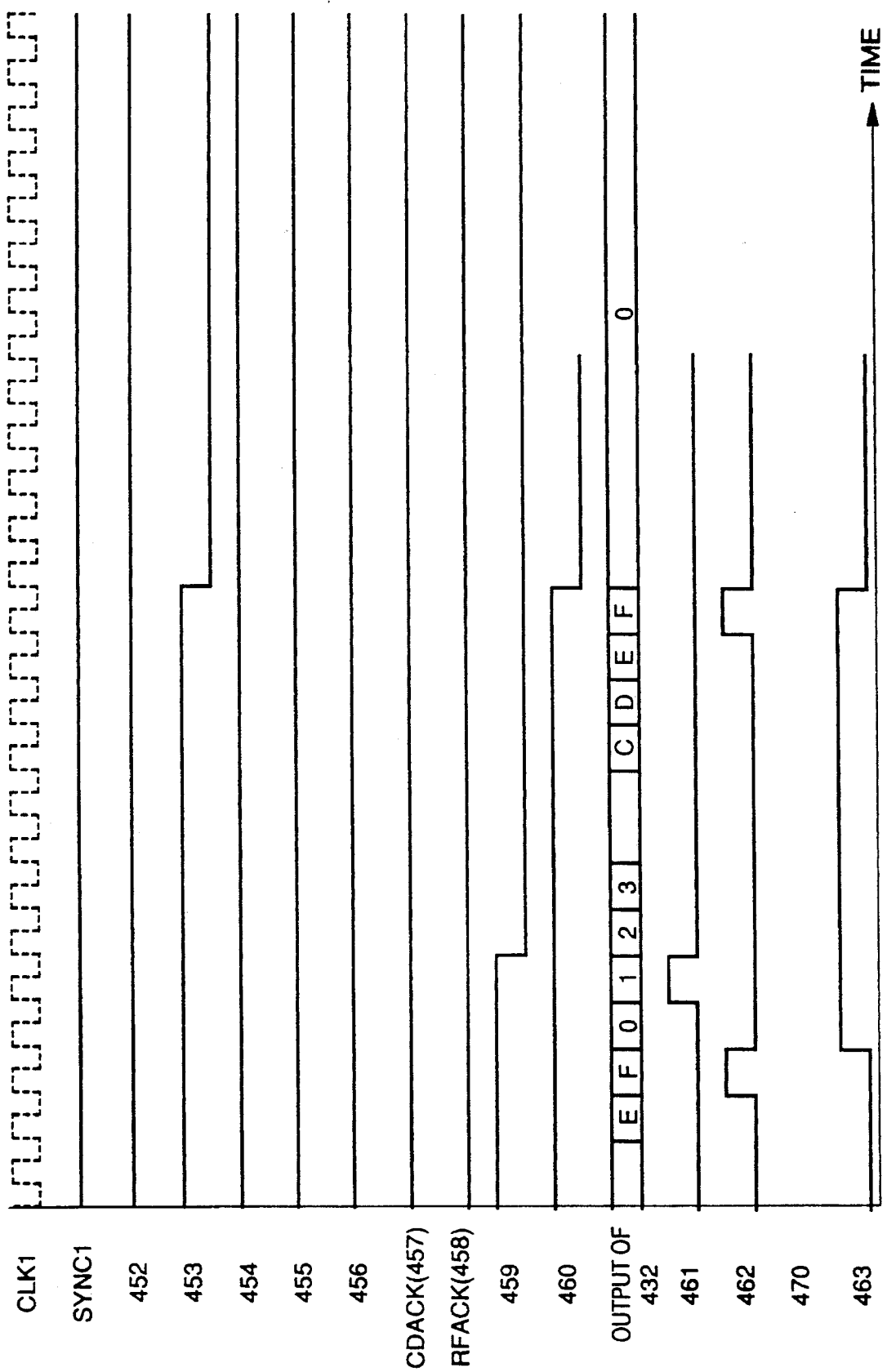
FIG. 23 is a timing chart illustrating the operation of FIGS. 19 and 20.

The timing charts of the above-described operation are shown in FIGS. 22 and 23.

With reference to FIGS. 24–27, the operation of adding header information is described by thinning a line synchronizing signal in a predetermined period.

Figure 24:
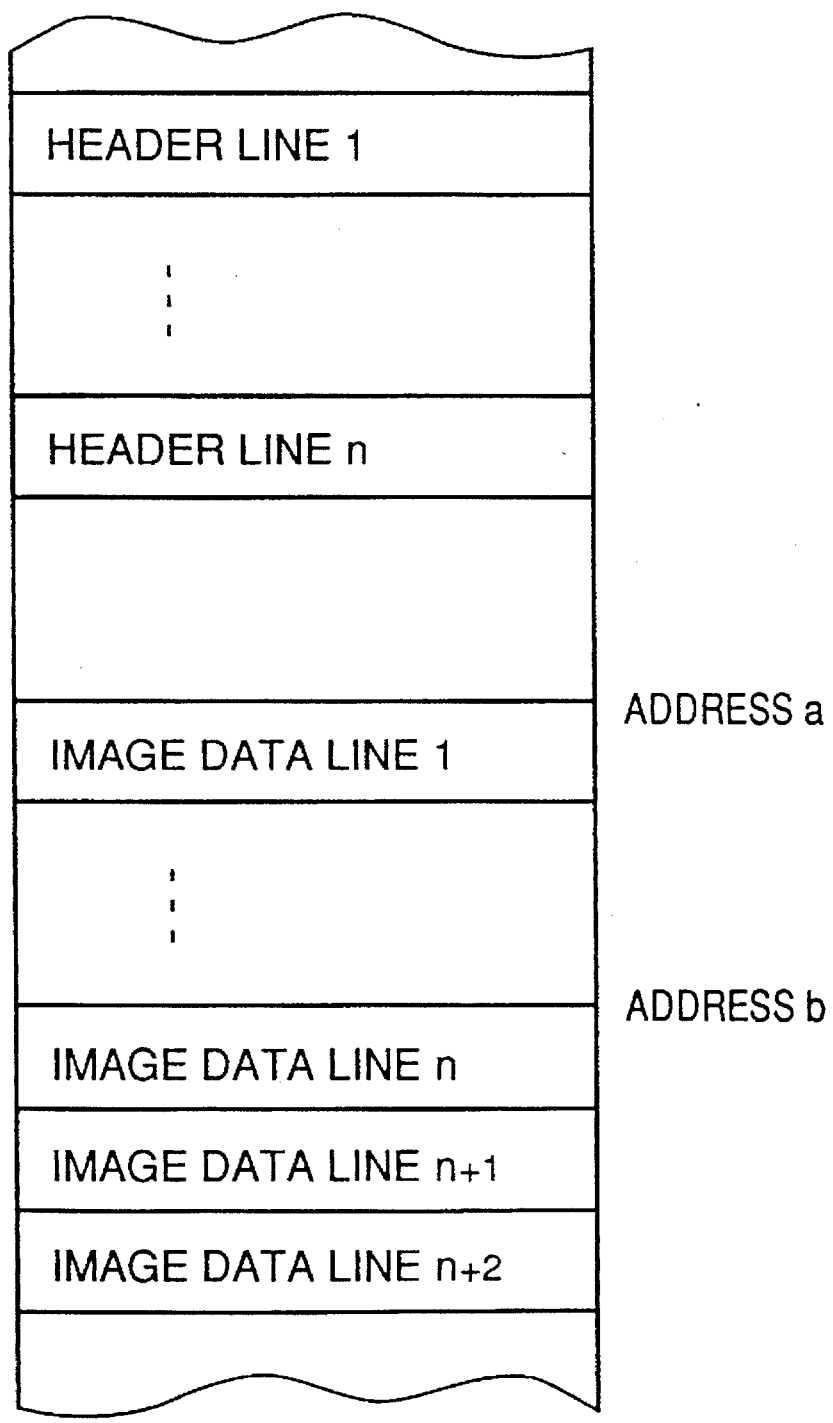
FIG. 24 shows a state of the memory storing header information and image data.
Figure 25A:
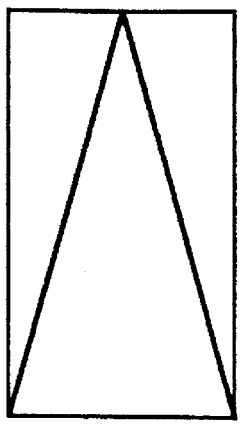
FIGS. 25A–25C show an example where the header information is added to the read image.
Figure 25B:
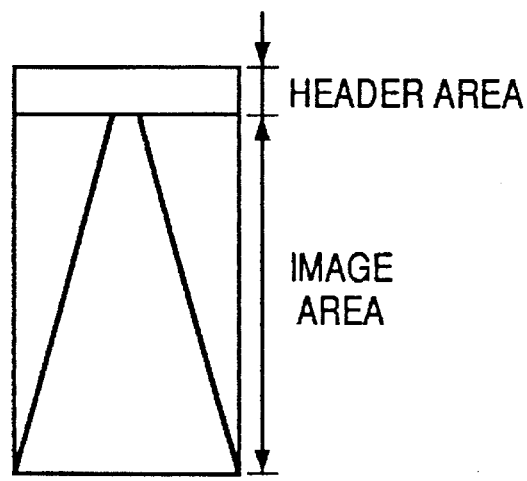
Figure 25C:
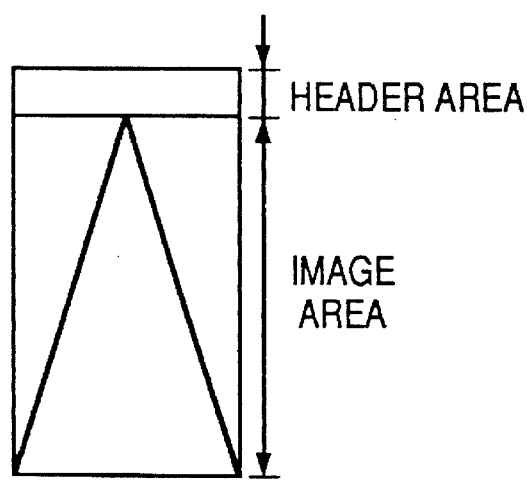

FIG. 24 shows the state of the header information and the image data stored in the memory 710. When the image data is stored in the format shown in FIG. 25A and the header information is added to within the image area, the image data of FIG. 25B is obtained. While when the header information is added to the outside of image area, the image data shown in FIG. 25C is obtained. For example, when the circuit shown in FIG. 26 is provided in the prior stage to the gate 401 of FIGS. 19 and 20, the encoding of the image data of FIG. 25B is executed.

Figure 26:
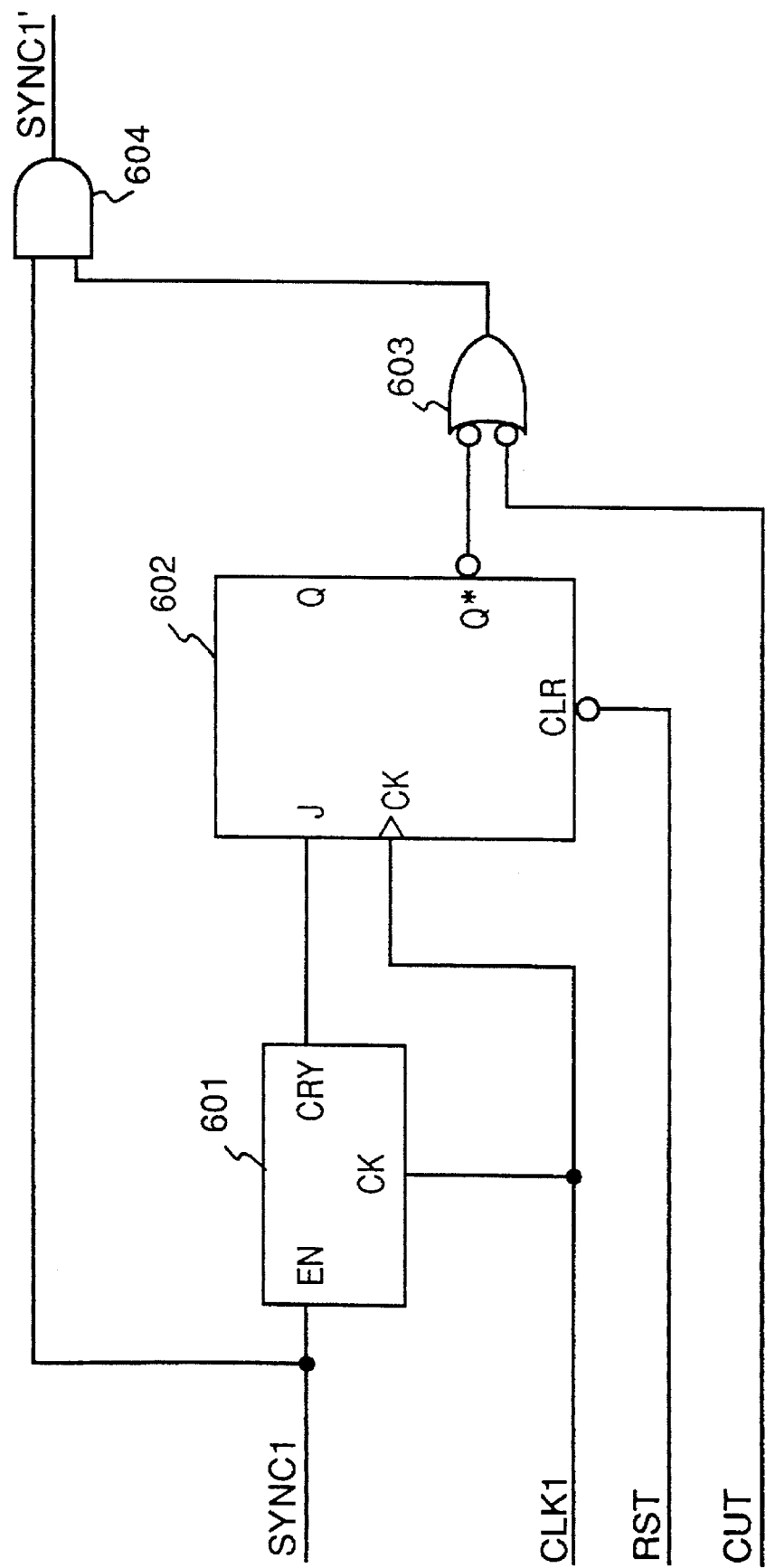
FIG. 26 is a circuit construction for thinning out line synchronizing signal.

In FIG. 26, numeral 601 is a counter which counts the signal SYNC1 in order to thin out a predetermined first line. When the counter 601 counts the predetermined value, the carry output is turned on and the JK flip-flop 602 is also turned on. Accordingly, the gate signal 603 becomes "ON" and then, the signal SYNC1 is outputted as a signal SYNC1' via the gate 604. Furthermore, when a signal CUT is "OFF" the signal SYNC1 is equal to the signal SYNC1' regardless of the signal 602.

Figure 27:
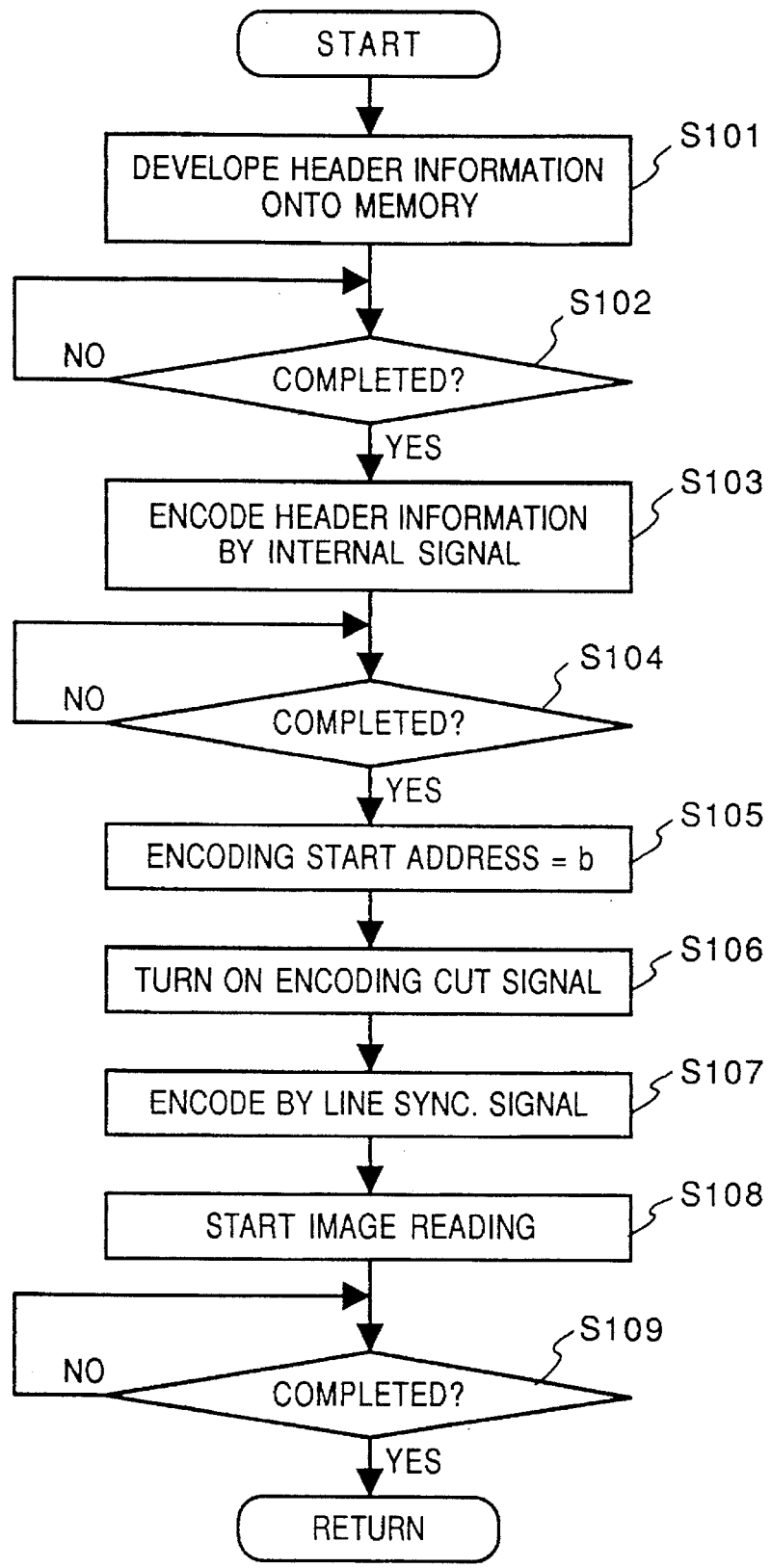
FIG. 27 is a flowchart indicating a procedure of the processing where the header information is added to the real image.

FIG. 27 is a flowchart illustrating the procedure of processing to add the header information shown in FIG. 25B by the control of the microprocessor which is not shown.

At step S101, the header information is developed on the memory 710 as shown in FIG. 24. When the development ends at step S102, the process proceeds to step S103 where the header information is encoded to a compressed code by the internal synchronizing signal. When the header information is encoded at step S104, the process proceeds to step S105 where the encoding start address is set to "b". At step S106, the encoding cut signal is turned on (CUT=1), and the encoding is started by the line synchronizing signal at step S107. When the image reading is started at step S108, the first n lines of the read image data is deleted, that is, the compressed code encoding is started from the image data of address "b" (LINE n+1).

When the compressed-code encoding ends at step S109, the compressed-code data of the image data as shown in FIG. 25B can be obtained. Furthermore, when the encoding start address is set to "a" and the encoding cut signal is set to "off" and the encoding is performed similarly, the compressed-code data including the header information can be obtained as FIG. 25C.

In the embodiment, the compressed-code encoding apparatus, which converts serial data into parallel data, stores the parallel data in a memory, encodes the data read out of the memory to the compressed code and stores the encoded compressed code, includes means for starting the encoding processing in accordance with the line synchronizing signal of the image data inputted in serial in each line unit. By this means, the image data inputted from the reader can be automatically encoded to the compressed-code. Furthermore, since the apparatus has no line memory, a speed matching is easily performed.

Furthermore, line skip occurred when the encoding processing cannot catch up with an image input can be avoided by including means for storing the number of line which is not subject to the encoding processing, means for adding one line which has not been subject to the encoding processing, and means for subtracting one line which has not been subject to the encoding processing.

Furthermore, when the header information is added to the read image data, the image data for the number of lines to be added can be automatically removed by having means for counting a line synchronizing signal, prohibiting the input of the line synchronizing signal to the encoder until the line synchronizing signal reaches a predetermined number, and not performing the encoding processing on the predetermined number of lines.

Still further, in an apparatus which performs an encoding processing on a plurality of image data in time division by having means for reading image data from a memory and encoding to compressed code, having at least two pair of means for storing parameters of encoding and means for packing the compressed code, and switching the above means, an encoding processing and other encoding processing with respect to the image reading processing is executed by starting the encoding processing by means for starting the encoding processing in accordance with a line synchronizing signal of the image data inputted in serial and each line unit, and means for starting the encoding processing in accordance with a line synchronizing signal generated in count means.

Still further, it is possible to reduce the buffer memory capacity of the read image data by processing the means for starting the encoding processing, so as to have priority over other processing, in accordance with a line synchronizing signal of the image data inputted in serial and each line unit. Thus, the encoding processing of the read image which needs to be processing immediately.

As described above, according to the fourth embodiment, multi-access and dual-access functions and encoding processes to cope with a high-speed communication and rapid access are executed by a simple arrangement and control with a small buffer-memory capacity.

As many apparently widely different embodiments of the present invention can be made without departing from the spirit and scope thereof, it is to be understood that the invention is not limited to the specific embodiments thereof except as defined in the appended claims.

The present invention can be applied to a system constituted by a plurality of devices, or to an apparatus comprising a single device.

Furthermore, the invention is applicable also to a case where the object of the invention is attained by supplying a program to a system or apparatus.

What is claimed is:

1. An image processing apparatus, comprising:

first input means for inputting a line at a time first image data representing a first page of an image;

second input means for inputting a line at a time second image data representing a second page of an image;

first selection means for alternately selecting a line at a time one of the first and second image data input a line at a time by said first and second input means;

second selection means for selecting one of first and second parameters corresponding to one of the first and second image data selected by said first selection means; and;

processing means for alternately processing a line at a time the first and second image data selected by said first selection means by using the first and second parameters selected by said second selection means, wherein said first selection means switches between the first and second image data whenever one line of image data is processed by said processing means.

2. An apparatus according to claim 1, wherein said processing means encodes the first and second image data a line at a time.

3. The apparatus according to claim 1, further comprising:

memory means for storing first and second image data representing first and second pages of images, respectively, wherein said first input means inputs the first image data stored in said memory means and said second input means inputs the second image data stored in said memory means.

4. An apparatus according to claim 1, wherein said processing means processes the first and second image data in accordance with first and second synchronizing signals, respectively.

5. An apparatus according to claim 3, wherein said memory mean stores the first and second processed image data obtained by processing the first and second image data by said processing means.

6. An image processing method consisting of the steps of:

a first inputting step for inputting a line at a time first image data representing a first page of an image;

a second inputting step for inputting a line at a time second image data representing a second page of an image;

a first selecting step for alternately selecting a line at a time one of the first and second image data input a line at a time by the first and second inputting steps;

a second selecting step for selecting one of first and second parameters corresponding to one of the first and second image data selected by the first selecting step; and a processing step for alternately processing a line at a time the first and second image data selected by the first selecting step by using the first and second parameters selected by the second selecting step;

wherein the first selecting step switches between the first and second image data whenever one line of image data is processed by said processing step.

7. The image processing method according to claim 6, wherein the processing step encodes the first and second image data a line at a time.

8. The image processing method according to claim 6, further comprising:

a storage step for storing first and second image data representing first and second pages of images, respectively, wherein the first inputting step inputs the first image data stored in the storage step and the second inputting step inputs the second image data stored in the storage step.

9. The image processing method according to claim 6, wherein the processing step processes the first and second image data in accordance with first and second synchronizing signals, respectively.

10. The image processing method according to claim 8, wherein the storage step stores first and second processed image data obtained by processing the first and second image data by the processing step.

* * * * *

UNITED STATES PATENT AND TRADEMARK OFFICE
CERTIFICATE OF CORRECTION

PATENT NO. : 5,566,254

DATED : October 15, 1996

INVENTOR(S) : Murata et al.

It is certified that error appears in the above-identified patent and that said Letters Patent is hereby corrected as shown below:

On the title page,
   item  56, UNDER REFERENCES CITED, FOREIGN PATENT DOCUMENTS "2065453 3/1990 Japan" should read --2-65453 3/1990 Japan--.

COLUMN 3
Line 15,
 "processing" should read --processings--.

COLUMN 4

Line 31, "21 in," should read --21, in--.

COLUMN 6

Line 51, "of" should read --a--.
Line 58, "stored" should read --stores--.

UNITED STATES PATENT AND TRADEMARK OFFICE
CERTIFICATE OF CORRECTION

PATENT NO. : 5,566,254

DATED : October 15, 1996

INVENTOR(S) : Murata et al.

It is certified that error appears in the above-identified patent and that said Letters Patent is hereby corrected as shown below:

COLUMN 8

```
Line 45, "enable," should read --enabled,--.
Line 51, "enable." should read --enabled.--.
Line 53, "enable." should read --enabled.--.
Line 55, "enable," should read --enabled,--.
Line 56, "enable." should read --enabled.--.
```

Signed and Sealed this

Twenty-seventh Day of May, 1997

Attest:

*Attesting Officer*

BRUCE LEHMAN
*Commissioner of Patents and Trademarks*